US010011686B2

(12) United States Patent
Bloomfield

(10) Patent No.: US 10,011,686 B2
(45) Date of Patent: *Jul. 3, 2018

(54) VISCOELASTIC SILICONE RUBBER COMPOSITIONS

(71) Applicant: UNIVERSITY OF VIRGINIA PATENT FOUNDATION, Charlottesville, VA (US)

(72) Inventor: Louis A. Bloomfield, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,808

(22) Filed: Dec. 14, 2016

(65) Prior Publication Data

US 2017/0233531 A1    Aug. 17, 2017

Related U.S. Application Data

(63) Continuation of application No. 14/237,715, filed as application No. PCT/US2012/050419 on Aug. 10, 2012, now Pat. No. 9,550,864.

(60) Provisional application No. 61/521,799, filed on Aug. 10, 2011, provisional application No. 61/532,167, filed on Sep. 8, 2011.

(51) Int. Cl.
| | |
|---|---|
| *C08G 77/20* | (2006.01) |
| *C08G 77/16* | (2006.01) |
| *C08L 83/04* | (2006.01) |
| *C08G 77/38* | (2006.01) |
| *C08K 3/38* | (2006.01) |
| *C08K 5/55* | (2006.01) |

(52) U.S. Cl.
CPC ............. *C08G 77/20* (2013.01); *C08G 77/16* (2013.01); *C08G 77/38* (2013.01); *C08K 3/38* (2013.01); *C08K 5/55* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 2,084,261 A | 6/1937 | Boughton et al. |
| 2,258,218 A | 10/1941 | Rochow |
| 2,258,219 A | 10/1941 | Rochow |
| 2,258,220 A | 10/1941 | Rochow |
| 2,258,221 A | 10/1941 | Rochow |
| 2,258,222 A | 10/1941 | Rochow |
| 2,371,068 A | 3/1945 | Rochow |
| 2,375,998 A | 5/1945 | McGregor et al. |
| 2,384,384 A | 9/1945 | McGregor et al. |
| 2,431,878 A | 12/1947 | McGregor et al. |
| 2,440,101 A | 4/1948 | Krieble |
| 2,442,613 A | 6/1948 | Nicodemus |
| 2,459,387 A | 1/1949 | McGregor et al. |
| 2,460,116 A | 1/1949 | Bazley |
| 2,517,945 A | 8/1950 | Upson |
| 2,541,851 A | 2/1951 | Wright |
| 2,602,327 A | 7/1952 | Bond |
| 2,606,611 A | 8/1952 | Max |
| 2,609,201 A | 9/1952 | Martin |
| 2,610,167 A | 9/1952 | Grotenhuis |
| 2,644,805 A | 7/1953 | Martin |
| 2,704,663 A | 3/1955 | Blake |
| 2,721,857 A | 10/1955 | Dickmann |
| 2,743,515 A | 5/1956 | Davis |
| 2,756,016 A | 7/1956 | Warren |
| 2,791,788 A | 5/1957 | Hausdorf |
| 2,796,765 A | 6/1957 | Hnston |
| 2,842,521 A | 7/1958 | Nitzsche |
| 2,871,616 A | 2/1959 | Sundell |
| 2,957,900 A | 10/1960 | Groszos |
| 2,983,697 A | 5/1961 | Brown |
| 3,050,490 A | 8/1962 | Nitzsche |

(Continued)

FOREIGN PATENT DOCUMENTS

| | | |
|---|---|---|
| CA | 588913 A | 12/1959 |
| GB | 797974 | 7/1958 |

(Continued)

OTHER PUBLICATIONS

International Search Report and Written Opinion for the International Searching Authority for WO 2011/112699 dated May 16, 2011.
Wick, "Bor-Siloxan-Elastomere," Kunststoffe Bd. 50 Heft 8, pp. 433-436 (1960).
Google translation of Wick, "Bor-Siloxan-Elastomere," Kunststoffe Bd. 50 Heft 8, pp. 433-436 (1960).
Flory, "Constitution of Three-Dimensional Polymers and the Theory of Gelation," J. Phys. Chem. 46:132-140 (1942).
Stockmayer, "Theory of Molecular Size Distribution and Gel Formation in Branched-Chain Polymers," J. Chem. Phys. 11(2):45-55 (1943).

(Continued)

Primary Examiner — Robert S Loewe
(74) Attorney, Agent, or Firm — J.A. Lindeman & Co., PLLC

(57) ABSTRACT

The invention provides for new viscoelastic silicone rubbers and compositions and methods for making and using them. The invention provides for viscoelastic silicone rubbers that are stiffer on short timescales than they are on long timescales. When subjected to brief stresses, they are relatively stiff and elastic, and they resist changing shapes. When subjected to sustain stresses, however, they are relatively soft and accommodating, and they gradually change shapes. When those stresses are removed, they gradually return to their original shapes. These viscoelastic silicone rubbers resist compression set and they are extremely resilient in response to sudden impacts. They can be dense rubbers, foam rubbers, and particles.

32 Claims, No Drawings

(56) References Cited

U.S. PATENT DOCUMENTS

| | | |
|---|---|---|
| 3,050,491 A | 8/1962 | Nitzsche |
| 3,070,559 A | 12/1962 | Nitzsche |
| 3,070,560 A | 12/1962 | Metevia |
| 3,070,566 A | 12/1962 | Nitzsche et al. |
| 3,070,567 A | 12/1962 | Nitzsche |
| 3,154,520 A | 10/1964 | Dupont |
| 3,177,176 A | 4/1965 | Boot |
| 3,197,319 A | 7/1965 | Wright |
| 3,213,048 A | 10/1965 | Boot |
| 3,230,121 A | 1/1966 | Nitzsche |
| 3,231,542 A | 1/1966 | Eisinger |
| 3,294,612 A | 12/1966 | Pail |
| 3,296,182 A | 1/1967 | Fekete |
| 3,330,797 A | 7/1967 | Kelly |
| 3,350,344 A | 10/1967 | Beers |
| 3,357,684 A | 12/1967 | Kunnen |
| 3,379,607 A | 4/1968 | Foster |
| 3,382,511 A | 5/1968 | Brooks |
| 3,415,778 A | 12/1968 | Burzynski et al. |
| 3,551,377 A | 12/1970 | Andrianovich |
| 3,600,351 A | 8/1971 | Hunt |
| 3,629,183 A | 12/1971 | Proriol |
| 3,661,790 A | 5/1972 | Dean |
| 3,677,997 A | 7/1972 | Kaiser |
| 3,772,240 A | 11/1973 | Greenlee |
| 3,801,535 A | 4/1974 | Joschko |
| 3,855,171 A | 12/1974 | Wegehaupt |
| 3,862,919 A | 1/1975 | Nitzsche |
| 3,969,309 A | 7/1976 | Wright |
| 4,054,714 A | 10/1977 | Mastrangelo |
| 4,180,642 A | 12/1979 | Takago |
| 4,339,339 A | 7/1982 | Maciejewski |
| 4,371,493 A | 2/1983 | Minuto |
| 4,381,491 A | 4/1983 | Vogelgesang |
| 4,405,687 A | 9/1983 | Morita et al. |
| 4,550,151 A | 10/1985 | Takamizawa et al. |
| 4,667,007 A | 5/1987 | Wengrovius et al. |
| 5,042,765 A | 8/1991 | Widerstrom |
| 5,125,191 A | 6/1992 | Rhoades |
| 5,258,068 A | 11/1993 | Shapero et al. |
| 5,292,799 A | 3/1994 | Naito et al. |
| 5,310,421 A | 5/1994 | Shapero et al. |
| 5,319,021 A | 6/1994 | Christy |
| 5,364,693 A | 11/1994 | Moren et al. |
| 5,391,336 A | 2/1995 | Akitomo et al. |
| 5,432,007 A | 7/1995 | Naito |
| 5,446,075 A | 8/1995 | Gibbon |
| 5,472,994 A | 12/1995 | Micallef et al. |
| 5,498,640 A | 3/1996 | Witt et al. |
| 5,502,144 A | 3/1996 | Kuo et al. |
| 5,507,866 A | 4/1996 | Drew et al. |
| 5,580,917 A | 12/1996 | Maciejewski et al. |
| 5,607,993 A | 3/1997 | Christy |
| 5,786,578 A | 7/1998 | Christy et al. |
| 5,869,164 A | 2/1999 | Nickerson et al. |
| 5,873,933 A | 2/1999 | Mackey |
| 6,127,457 A | 10/2000 | Darling |
| 6,242,373 B1 | 6/2001 | Mangold et al. |
| 6,287,372 B1 | 9/2001 | Briand et al. |
| 6,391,941 B1 | 5/2002 | Colin |
| 6,613,440 B2 | 9/2003 | Hara et al. |
| 6,623,791 B2 | 9/2003 | Sadvary et al. |
| 6,701,529 B1 | 3/2004 | Rhoades et al. |
| 7,381,460 B2 | 6/2008 | Palmer et al. |
| 7,393,879 B1 | 7/2008 | Kresta et al. |
| 7,608,314 B2 * | 10/2009 | Plant .............. A41D 31/005 428/116 |
| 7,658,972 B2 | 2/2010 | Matsumura |
| 2002/0086168 A1 | 7/2002 | Sadvary et al. |
| 2003/0069351 A1 | 4/2003 | Kishihara et al. |
| 2004/0072653 A1 | 4/2004 | Minuto et al. |
| 2004/0082886 A1 | 4/2004 | Timpson |
| 2004/0171321 A1 | 9/2004 | Plant |
| 2005/0037189 A1 | 2/2005 | Palmer et al. |
| 2005/0209400 A1 | 9/2005 | Tsumura et al. |
| 2005/0282450 A1 | 12/2005 | Sauer et al. |
| 2006/0243947 A1 | 11/2006 | Tsumura et al. |
| 2007/0029690 A1 | 2/2007 | Green et al. |
| 2007/0105977 A1 | 5/2007 | Gabriel et al. |
| 2007/0106015 A1 | 5/2007 | Zhu et al. |
| 2007/0152117 A1 | 7/2007 | Byrd |
| 2008/0017070 A1 | 1/2008 | Prezzi et al. |
| 2009/0014750 A1 | 1/2009 | Katayama et al. |
| 2009/0252970 A1 | 10/2009 | Tamura |
| 2009/0305589 A1 | 12/2009 | Budden et al. |
| 2009/0324927 A1 | 12/2009 | Palmer et al. |
| 2010/0132099 A1 * | 6/2010 | Green ............... A41D 31/0044 2/455 |
| 2010/0316876 A1 | 12/2010 | Zhu |
| 2011/0021736 A1 | 1/2011 | Zhu |
| 2011/0039087 A1 | 2/2011 | Cauvin et al. |
| 2011/0251321 A1 | 10/2011 | Zhu et al. |

FOREIGN PATENT DOCUMENTS

| | | |
|---|---|---|
| GB | 859284 | 1/1961 |
| GB | 921964 A * | 3/1963 |
| GB | 947847 | 1/1964 |
| GB | 974305 | 11/1964 |
| GB | 989409 | 4/1965 |
| GB | 1069584 | 5/1967 |
| JP | 54084000 | 7/1979 |
| JP | 62277475 | 12/1987 |
| JP | 02-269157 | 11/1990 |
| JP | 10195381 | 7/1998 |
| WO | 85/02854 A1 | 7/1985 |
| WO | 2009/129179 A1 | 10/2009 |
| WO | 2009/131838 A1 | 10/2009 |
| WO | 2011/112699 A1 | 9/2011 |
| WO | 2013/023174 A1 | 2/2013 |

OTHER PUBLICATIONS

English-language abstract of JP 02-269157, publication date of Nov. 2, 1990.
English-language abstract of JP 10195381, publication date of Jul. 28, 1998.
English-language abstract of JP 54084000, publication date of Jul. 4, 1979.
English-language abstract of JP 62277475, publication date of Dec. 2, 1987.
Sep. 6, 2014, Office Action in U.S. Appl. No. 13/583,397.
Search Report and Written Opinion for PCT International Application No. PCT/US2012/050419, dated Jan. 11, 2013.
Extended European Search Report for Application No. EP 12822115.7 dated May 8, 2015.

* cited by examiner

VISCOELASTIC SILICONE RUBBER COMPOSITIONS

CROSS-REFERENCE TO RELATED APPLICATIONS

This application is a Continuation Application based on U.S. patent application Ser. No. 14/237,715, filed Oct. 31, 2014; which claims priority to PCT International Application PCT/US2012/050419, filed Aug. 10, 2012; which claims priority to U.S. Provisional Application Nos. 61/521,799, filed Aug. 10, 2011, and 61/532,167, filed Sep. 8, 2011.

BACKGROUND OF THE INVENTION

Soon after Rochow invented polyorganosiloxanes or "silicones" (U.S. Pat. No. 2,258,218-2,258,222), McGregor discovered that heating boric acid together with silicones produced a viscoelastic fluid that became known as "bouncing putty" (U.S. Pat. No. 2,431,878). This remarkable fluid rebounds almost perfectly when dropped on a hard surface yet, like any fluid, it has no fixed shape. More specifically, bouncing putty responds elastically to sudden impacts, but flows slowly in response to prolonged stresses. Bouncing putty has a viscosity that increases with rate of shear, so it is a shear-thickening fluid or, equivalently, a dilatant fluid.

Since its discovery, bouncing putty has been improved and modified in a number of ways. Wright (U.S. Pat. No. 2,541,851) added a filler such as zinc hydroxide to the putty to improve its bounce. Martin (U.S. Pat. No. 2,644,805) showed that bouncing putty can be formed from boric acid and tetramethyl disiloxane diol-1,3. Boot (U.S. Pat. No. 3,177,176) found that adding silica reinforcing filler to the silicones before adding the boron compounds caused the bouncing putty to form more quickly and at a lower temperature during the subsequent heating step. Boot (U.S. Pat. No. 3,213,048) discovered that bouncing putty can be formed at room temperature by adding alkyl borates to silanol-terminated polydimethylsiloxanes (PDMS).

Beers (U.S. Pat. No. 3,350,344) found that adding an ammonium carbonate salt to bouncing putty prevents the putty from flowing under the stress of its own weight and from staining fabrics. Dean (U.S. Pat. No. 3,661,790) prepared glowing bouncing putty by adding activated zinc sulfide and also reduced the putty's density by incorporating small transparent spheres. Kaiser (U.S. Pat. No. 3,677,997) added polyglycols to bouncing putty and thereby reduced its tendency to become tacky upon extended kneading or use. Mastrangelo (U.S. Pat. No. 4,054,714) discloses that adding noble metal particles to bouncing putty renders that putty electrically conducting. Minuto (U.S. Pat. No. 4,371,493) discloses a method for producing bouncing putty from a dimethyl silicone gum, a boron compound, and a reinforcing filler. Christy (U.S. Pat. No. 5,319,021) added discrete elastic particles to bouncing putty to obtain a material that largely recovers its initial form when a deforming stress is removed. Christy (U.S. Pat. No. 5,607,993) subsequently added thermoplastic microspheres to bouncing putty to reduce its average density to approximately 0.6 g/cc.

Bouncing putty is not, however, the only example of boron being added to silicones. Rochow (U.S. Pat. No. 2,371,068) employed boric acid esters as dehydrating agents for silicols. Nicodemus (U.S. Pat. No. 2,442,613) added boric acid or an organic borate to a heat-hardenable silicone to prevent copper from corroding when the silicone is vulcanized onto that copper. McGregor (U.S. Pat. No. 2,459,387) employed boron trifluoride as a dehydrating agent. Upson (U.S. Pat. No. 2,517,945) combined a silanediol with a boronic acid to obtain a thermoplastic copolymer, but noted no unusual viscoelastic properties in the finished copolymer. Dickmann (U.S. Pat. No. 2,721,857) found that adding 0.005 to 0.090 wt % boron compound to unvulcanized silicone elastomer stock improved the handling of that stock and reduced its stickiness, but teaches that "when the boron compound is present in an amount exceeding the upper limit set forth above [0.090 wt %], the physical properties of the resulting silicone elastomer are seriously impaired."

Nitzsche (U.S. Pat. No. 2,842,521) found that boric acid hydroxyl complexes act as catalysts for the curing of organosiloxane resins, but noted no unusual viscoelastic properties in the finished polymer. Brown (U.S. Pat. No. 2,983,697) added 0.01 to 0.16 wt % boron as tris-triorganosilyl-borates to silicone elastomers to retard crepe hardening, but teaches that "When the amount of boron is greater than 0.16 part per 100 parts of siloxane . . . , the additional boron . . . degrades other physical properties."

Nitzsche (U.S. Pat. No. 3,050,490) disclosed that adding boron nitride to hydroxyl enblocked polymeric dimethylsiloxane gum, forming the mixture into a tape, and prevulcanizing that mixture resulted in a self-adhering tape that could be wound on an object and vulcanized into a homogeneous, unitary tube. Nitzsche (U.S. Pat. No. 3,050,491) disclosed that adding 0.001 to 0.1 wt % boric acid or alkyl borates produced self-adhering material, but teaches that "Larger quantities of boron compound impede the vulcanization and depress the physical properties of the ultimate rubber." Nitzsche (U.S. Pat. No. 3,070,559) discloses cross-linking agents that can be used to make silicone rubbers and includes without comment in a long list of compounds "esters of boric acid." Nitzsche (U.S. Pat. No. 3,070,567) then discloses that incorporating 0.1 to 10 wt % of a complex compound of boric acid and a polyhydric alcohol in a silicone base can yield self-adhering tapes that stick to themselves only at elevated temperature.

In a patent on self-adhering silicone rubber, Nitzsche (U.S. Pat. No. 3,230,121) discloses the use of boron-containing self-adhering silicone rubber insulating tape to protect hollow glass articles. He notes that "The silicone rubbers of the present discovery possess the surprising property that the more violent the blow, the greater will be the rebound elasticity. They possess this property in common with the above-mentioned 'bouncing putty,' to which they are chemically related." Nitzsche's comment is made in the context of protecting glassware from impact and is not generalized to any other purpose. Moreover, the silicone rubbers Nitzsche employed in U.S. Pat. No. 3,230,121 are themselves prior art and Nitzsche provides a comprehensive list of prior art patents. The most recent of those prior art patents is Nitzsche's own work: U.S. Pat. No. 3,050,491 (listed in U.S. Pat. No. 3,230,121 as "Serial No. 9,428, filed Feb. 18, 1960"). In U.S. Pat. No. 3,050,491, Nitzsche teaches against using more than 0.1 wt % boron compounds in silicone elastomers.

Eisinger (U.S. Pat. No. 3,231,542) discloses boron-containing self-adhering silicone rubbers with improved surface characteristics. Fekete (U.S. Pat. No. 3,296,182) incorporates approximately 0.35 wt % boric acid to silicones, along with a titanium compound, to obtain pressure-sensitive adhesive elastomers. Kelly (U.S. Pat. No. 3,330,797) discloses additional boron-containing self-adhering silicone elastomers. Foster (U.S. Pat. No. 3,379,607) added boron compounds to silicones to promote adhesion to surfaces. Proriol (U.S. Pat. No. 3,629,183) discloses boron-containing silicones that vulcanize to form adhesive elastomers on heating. Greenlee (U.S. Pat. No. 3,772,240) found that adding boric acid to silicones improved their adhesion to metals. Wegehaupt (U.S. Pat. No. 3,855,171) incorporates pyrogenically produced mixed oxides of boron and an element selected from the class consisting of silicon, aluminum, titanium and iron in silicones for the purposes of preparing either self-adhering elastomers or bouncing putty.

Maciejewski (U.S. Pat. No. 4,339,339) recognizes that bouncing putty's bounciness makes it unable to absorb energy during sudden impacts. He discloses a boron-containing, non-vulcanizable silicone for use for hydrostatic damping and shock absorption that is able to absorb energy during impacts because it does not exhibit the unusual resiliency of bouncing putty.

SUMMARY OF THE INVENTION

The invention is directed to viscoelastic silicone rubber compositions, which are part of a broad class of compounds that include dense materials, foamed materials, comminuted materials, and materials that can be molded and even incorporated in other known materials to form blended materials and composite materials. These materials are solids in that they have equilibrium shapes to which they return in the absence of imposed stresses, but they exhibit time-dependent stiffnesses: they are stiffer at short timescales than they are at long timescales. A viscoelastic silicone rubber composition of the invention exhibits a Shore Hardness that decreases significantly as the duration of the measurement increases. For example, as shown in FIG. 1 of International Patent Application No. PCT/US2011/027720, which is incorporated herein by reference, when a Shore durometer is pressed against the surface of the rubber, the immediate reading of the durometer is significantly greater than the reading of that same durometer after it has been in place for 60 seconds. In other words, a viscoelastic silicone rubber composition has a greater Shore Hardness at time zero, t=0, than it does after 60 seconds, t=60 seconds.

In one embodiment, the invention provides viscoelastic silicone rubber compositions that exhibit a high level of resilience when subjected to a sudden impact, but deform extensively when subjected to a prolonged stress. For example, a heavy metal ball dropped on the embodiment will rebound almost to its original height and leave the embodiment's shape virtually unchanged. But that same heavy metal ball allowed to rest on the embodiment for a minute or two will cause the embodiment's surface to dent significantly. When the ball is subsequently removed from the embodiment, the dent will gradually disappear from its surface and the embodiment will return to its original equilibrium shape.

Accordingly, in one embodiment, the viscoelastic silicone rubbers of the invention are stiffer on short timescales than they are on long timescales. When subjected to brief stresses, the viscoelastic silicone rubber composition is relatively stiff and elastic, and it resists changing shapes. When subjected to sustained stresses, however, it is relatively soft and accommodating, and it gradually changes shapes. When those stresses are removed, it gradually returns to its original shape. These viscoelastic silicone rubbers resist compression set and they are extremely resilient in response to sudden impacts. They can be dense rubbers, foam rubbers, and particles.

In one embodiment, the invention provides a silicone rubber composition in which some of the crosslinks are permanent and others of the crosslinks are temporary. Because a fraction of its crosslinks can come apart and then reform, a viscoelastic silicone rubber composition of the invention can relax stress in response to strain and thus adapt to new shapes. The composition has sufficient permanent crosslinks, however, to establish a permanent equilibrium shape to which the composition will eventually return when not subject to any imposed stress. A viscoelastic silicone rubber composition has sufficient temporary crosslinks to give the composition a stiffness that is greater on short timescales than it is on longer timescales.

In another embodiment, the invention provides viscoelastic silicone rubber compositions comprising: (a) at least one polyorganosiloxane comprising at least one ethylenically-unsaturated group; (b) optionally at least one permanent crosslinking agent; and (c) at least one temporary crosslinking agent; wherein the composition contains sufficient permanent crosslinks to give the composition an equilibrium shape and sufficient temporary crosslinks to give the composition a stiffness that is greater on short timescales than it is on long timescales.

In another embodiment, the invention provides viscoelastic silicone rubber compositions comprising: (a) at least one branched polyorganosiloxane; (b) at least one permanent crosslinking agent present in an amount to provide sufficient permanent crosslinks to give the composition an equilibrium shape; and (c) at least one temporary crosslinking agent present in an amount to provide sufficient temporary crosslinks to give the composition a stiffness that is greater on short timescales than it is on long timescales.

In another embodiment, the invention provides viscoelastic silicone rubber compositions comprising: (a) at least one polyorganosiloxane; (b) at least one permanent crosslinking agent present in an amount to provide sufficient permanent crosslinks to give the composition an equilibrium shape; (c) at least one temporary crosslinking agent present in an amount to provide sufficient temporary crosslinks to give the composition a stiffness that is greater on short timescales than it is on long timescales; and (d) at least one softening agent present in an amount sufficient to make the average lifetime of the temporary crosslink of shorter duration than the average lifetime of the temporary crosslink in the absence of the softening agent.

DESCRIPTION OF THE INVENTION

In one embodiment, the invention provides viscoelastic silicone rubber (VSR) compositions comprising: (a) at least one polyorganosiloxane containing at least one ethylenically-unsaturated group; (b) optionally at least one permanent crosslinking agent; and (c) at least one temporary crosslinking agent; wherein the composition contains sufficient permanent crosslinks to give the composition an equilibrium shape and sufficient temporary crosslinks to give the composition a stiffness that is greater on short timescales than it is on long timescales. Each of these components is discussed below.

In another embodiment, this invention relates to viscoelastic silicone rubber compositions comprising: (a) at least one branched polyorganosiloxane; (b) at least one permanent crosslinking agent present in an amount to provide sufficient permanent crosslinks to give the composition an equilibrium shape; and (c) at least one temporary crosslinking agent present in an amount to provide sufficient temporary crosslinks to give the composition a stiffness that is greater on short timescales than it is on long timescales. Each of these components is discussed below.

In another embodiment, the invention provides viscoelastic silicone rubber compositions comprising: (a) at least one polyorganosiloxane; (b) at least one permanent crosslinking agent present in an amount to provide sufficient permanent crosslinks to give the composition an equilibrium shape; (c) at least one temporary crosslinking agent present in an amount to provide sufficient temporary crosslinks to give the composition a stiffness that is greater on short timescales than it is on long timescales; and (d) at least one softening agent present in an amount sufficient to make the average lifetime of the temporary crosslink of shorter duration than the average lifetime of the temporary crosslink in the absence of the softening agent. Each of these components is discussed below.

In a VSR composition of the invention, some of the crosslinks are permanent and others of the crosslinks are temporary. Because a fraction of its crosslinks can come apart and then reform, a VSR composition of the invention can relax stress in response to strain and thus adapt to new shapes. The composition has sufficient permanent crosslinks, however, to establish a permanent equilibrium shape to which the composition will eventually return when not subject to any imposed stress. In other words, the amount of permanent crosslinks is sufficient to make the rubber composition a solid. A VSR composition has sufficient temporary crosslinks to give the composition a stiffness that is greater on short timescales than it is on longer timescales. If a force is quickly applied to a VSR composition of the invention, it feels relatively stiff and undergoes relatively little strain. If the force is applied for a longer time, however, the composition feels relatively soft and undergoes relatively substantial strain. Furthermore, the composition possesses a resilience during impact that increases with the speed of that impact. When the composition is struck sharply, it exhibits enhanced stiffness and undergoes particularly little strain. Moreover, the composition stores the work done on its surface efficiently and returns nearly all of that work during the rebound.

Conventional silicone rubber is a solid formed when individual chain-like polyorganosiloxane molecules (silicones) are crosslinked together into an extensive network. The crosslinks have little effect on the short-range mobilities of the individual molecular chains since those chains can still slide across one another at room temperature. However, the crosslinks severely limit the long-range mobilities of those chains. The vast network of linkages, loops, and tangles present in a heavily crosslinked silicone material give that material a fixed equilibrium shape and render it a solid.

Prior to crosslinking, a base material consisting of countless individual silicone chains is liquid at room temperature, although it may be quite viscous. In general, the higher the average molecular weight of the individual silicone molecules, the more viscous the liquid. As the extent of crosslinking increases, the average molecular weight of the individual silicone molecules increases and branching develops—three or more silicone chains meeting at a single molecular junction. Loops and tangles also develop in the collection of crosslinked chains.

When the extent of crosslinking exceeds a certain level, the silicone "gels"—it becomes a soft, fragile solid. The network of crosslinked silicone chains is then so extensive that macroscopic regions of the material are spanned by crosslinked molecules and these molecules have limited mobility. To form a robust silicone rubber, however, crosslinking must continue beyond the gel point. With additional crosslinking, the silicone rubber becomes stiffer and stronger, but it also becomes less able to adopt substantially different shapes. There is a trade-off between the crosslinked silicone's tendency to maintain a specific equilibrium shape and its ability to adopt other shapes in response to stresses. Thus a highly crosslinked silicone rubber is very stiff and it resists deformation. When a silicone rubber is strained beyond its elastic limit, that rubber tears. To improve their tear strengths, virtually all conventional silicone rubbers contain reinforcing fillers such as fumed silica.

The VSR compositions of this invention are also crosslinked structures but differ from conventional silicone rubber compositions. The VSR compositions of the invention include some crosslinks that are temporary rather than permanent. In a conventional silicone rubber, all of the crosslinks are permanent. A "permanent crosslink" is one that is unlikely to come apart at ordinary temperatures (generally <50° C.) in an ordinary amount of time (generally <1 day). One example of a permanent crosslink between two separate silicone chains is an -oxygen-silicon-oxygen- bridge that connects two silicon atoms in separate silicone chains by way of another silicon atom. At ordinary temperatures, the covalent chemical bonds that hold the -oxygen-silicon-oxygen- bridge together and link it to the two chains are extremely unlikely to come apart in an ordinary amount of time. Because all of its crosslinks are permanent, a fully cured conventional silicone rubber exhibits virtually no time evolution, e.g., deformation over time. When subject to constant strain, a fully cured conventional silicone rubber responds with constant stress and acts to return itself to its original equilibrium shape no matter how long that strain continues. The relationship between stress and strain in a conventional silicone rubber resembles that of an ordinary spring and is approximately time-independent.

In the VSR compositions of this invention, some crosslinks are temporary. A "temporary crosslink" is a crosslink that has a significant probability of coming apart at ordinary temperatures (<50° C.) in an ordinary amount of time (<1 day). One example of a temporary crosslink between two separate silicone chains is a silicon-oxygen-boron-oxygen-silicon bridge that connects two silicon atoms in separate silicone chains by way of the boron atom. These chemical bonds have a substantial probability of coming apart at ordinary temperatures in an ordinary amount of time, particularly when there are water, alcohol, and/or carboxylic acid molecules present in the material. Once a temporary crosslink has come apart, the boron moiety becomes chemically active again and can attach itself to a different silicone chain or to the same silicone chain but after a time when the temporary crosslink has been broken. For simplicity, and merely to illustrate this while not being bound to this theory, a temporary crosslink can "open" (detach from one or more silicone chains) and "close" (attach to one or more silicone chains) in a relatively short amount of time (e.g., in milliseconds, seconds, minutes, or hours). The rate at which the temporary crosslinks open and close may depend on temperature and the chemical environment near those crosslinks.

Because some of its crosslinks are temporary, a fully cured VSR of this invention exhibits time evolution. When subject to a strain that appears suddenly and then remains constant, the material initially responds with constant stress. On short timescales, the material's stiffness depends on both the permanent and temporary crosslinks. But as the material's temporary crosslinks open and close, its network structure evolves and its stress relaxes. At long time scales, in the limit of infinite time, the temporary crosslinks relax completely and thus do not contribute to the material's stress. Since the permanent crosslinks cannot relax, they continue to contribute to the material's stress indefinitely. On long timescales, the material's stiffness and shape depend only on the permanent crosslinks.

The temporary crosslinks remain important in the strained but relaxed VSR. The temporary crosslinks do not simply open during the relaxation process; they close to form new and different temporary crosslinks. When the strain is suddenly removed from the material, the formation of new temporary crosslinks produces stress in the material. In effect, the strained material gradually adapted to its new strained shape and it acts to oppose a sudden return to its original equilibrium shape. This new stress gradually relaxes as the temporary crosslinks open and close, until, over a long time scale, in the limit of infinite time, the unstrained material becomes once again free of stress and returns to its original shape.

It is useful to view a VSR of this invention as having two overlapping and possibly interconnected networks: one permanent and the other temporary. The permanent network has a fixed topology and gives the material a permanent equilibrium shape—the shape to which it will return when free of imposed stress for a sufficient period of time. When the material is subject to constant strain, that permanent network produces a constant stress. The temporary network, however, has a topology that evolves with time and it relaxes so as to eliminate stress.

When a VSR has been free of strain for a sufficient time, the material adopts its equilibrium shape and both of the permanent and temporary networks are free of stress. The overall material is then free of both stress and strain.

VSR compositions of the invention exhibit time-dependent responses to sudden changes in strain. When an unstressed, unstrained VSR composition of the invention is subject to a sudden strain which then remains constant, its permanent crosslink network responds with a stress that rises suddenly and then remains constant. In contrast, the material's temporary network responds with a stress that rises suddenly and then relaxes, ultimately to zero. When the strained but relaxed material is suddenly returned to zero strain and then remains at zero strain, its permanent network responds with stress that drops suddenly to zero and remains at zero. The material's temporary network, however, responds once more with a stress that rises suddenly and then relaxes to zero. In other words, the permanent network acts to return the material to its equilibrium shape while the temporary network acts to oppose any rapid change in the material's shape.

VSR compositions of the invention also exhibit time-dependent responses to sudden changes in stress. When an unstressed, unstrained VSR composition of the invention is subject to a sudden stress that then remains constant, both its permanent and temporary network oppose the stress and the material responds with a small strain. The temporary network, however, gradually relaxes its opposition to the stress so that the material's strain increases with time. Eventually, only the permanent network is opposing the stress and the material reaches a constant large strain.

When the stressed but relaxed material is suddenly returned to zero stress and then remains at zero stress, the two networks oppose one another. The permanent network acts to return the material to its equilibrium shape, but the temporary network has adapted to the new shape and acts to oppose the return to material's equilibrium shape. The temporary network, once more, gradually relaxes (the temporary crosslinks open and reform) its opposition and allows the material to return to its equilibrium shape.

To be a solid (i.e., to have a permanent equilibrium shape), any silicone rubber must have enough permanent crosslinks to connect the individual silicone chains into macroscopic networks, so that topology and tangles forever dictate that material's shape. The VSR compositions of this invention are no exception: they must have sufficient permanent crosslinks to establish a permanent equilibrium shape. The VSR compositions of the invention may be formed into a wide variety of shapes and using the same techniques as with conventional silicone rubbers. Typically, as is known in the art, a silicone rubber is shaped by placing an uncured liquid silicone composition into a mold and then crosslinking that composition into a solid rubber.

Once a minimum amount of permanent crosslinking has been reached, however, additional crosslinks in a VSR composition of the invention may include further permanent crosslinks or may be all temporary crosslinks. Additional permanent crosslinks increase both the short timescale and long timescale stiffnesses of the silicone rubber, while additional temporary crosslinks increase only the short timescale stiffness of a VSR composition of the invention.

One common approach to forming crosslinks is to add a crosslinking agent, often in the presence of one or more catalysts. Catalysts may also assist in the self-crosslinking between crosslinkable groups on the polyorganosiloxane, without the addition of a crosslinking agent. Molecules of the crosslinking agent then attach themselves to one or more of the silicone chains. A crosslinking molecule that attaches itself to only a single chain does little to form extended networks. Even a crosslinking molecule that attaches itself to two chains barely contributes to network forming. But a crosslinking molecule that attaches itself to three or more chains contributes significantly to the vast networks needed to form solids.

The amount of crosslinking agent needed to transform a liquid silicone into a solid gel has been determined theoretically by Flory (Paul J. Flory, J. Phys. Chem. 46, 132 (1942)), Stockmayer (Walter H. Stockmayer, J. Chem. Phys. 11, 45 (1943)), and others. For the case where the crosslinking agent attaches itself only to the ends of the silicone chains, this threshold amount follows a simple formula. The term "coordination number" denotes the number of silicone chain ends to which a single molecule of the crosslinking agent can bind and it is assumed that the crosslinking agent attaches itself to chain ends with perfect efficiency—i.e., that the number of attached chain ends is equal to the number of crosslinker molecules times the crosslinker's coordination number. In that case, the gelation threshold is:

$$\frac{\text{attached chain ends}}{\text{total chain ends}} = \frac{1}{(\text{coordination number} - 1)}$$

For a crosslinking agent that attaches to 3 chains, at least one half of the chain ends must be attached to crosslinking molecules before the material can begin to solidify. For a crosslinking agent that attaches to 4 chains, one third of the chain ends must be attached. And for a crosslinking agent that attaches to 21 chains, only 5% of the chain ends must be attached in order for the material to begin to solidify.

It is clear that a liquid composed of silicone chains can be transformed into a solid by attaching a small fraction of the chains' reactive ends to a crosslinking agent with a large coordination number. If this crosslinking agent forms permanent crosslinks, then it will give the material a permanent equilibrium shape. The remaining reactive chain ends are still available for attachment to something else, such as a temporary crosslinking agent.

The crosslinking agent may also attach itself to points along the backbones of the silicone chains and/or to branch points in branched silicone molecules. However, it is more difficult to predict the amount of crosslinking agent needed to transform a liquid silicone into a solid gel under such conditions. Nonetheless, once that crosslinking agent has formed enough permanent crosslinks to give the material a permanent equilibrium shape, any remaining reactive sites on the silicone molecules can be attached to something else, such as a temporary crosslinking agent.

Polyorganosiloxanes

Any polyorganosiloxane having silanol groups at the ends of polyorganosiloxane chains and/or on the backbones of polyorganosiloxane chains may be used to prepare a VSR composition of the invention, including, for example, silanol-terminated polyorganosiloxanes (STPOS). Polyorganosiloxanes generally exist as liquids of varying viscosities. Those liquids may be used as the base material for the preparation of a VSR composition of the invention or as the base material for the preparation of partially-crosslinked, branched polyorganosiloxanes that may also be used for the preparation of a VSR composition of the invention. "Branched polyorganosiloxanes" includes those polyorganosiloxanes that have one or more branch points and/or are mixtures thereof.

The polyorganosiloxane base which may be used to prepare the VSR compositions (or partially-crosslinked, branched polyorganosiloxanes) are preferably those polyorganosiloxane polymers having primarily methyl groups bound to the silicon atoms making up the siloxane backbone with hydroxyl groups at the terminal ends of the siloxane backbone. The base is typically a liquid polymer composition. The molecular weight of the polymers may range from about 400 to about 110,000 Daltons and preferably from about 700 to about 43,500 Daltons and more preferably from about 1,600 to about 36,000 Daltons. The viscosity of the polymers may range from about 16 to about 50,000 cSt and preferably from about 30 to 3,500 cSt and more preferably from about 40 to about 2000 cSt. STPOS, particularly silanol-terminated polydimethylsiloxane (STPDMS), are commonly used in condensation-cure silicone rubbers and in the preparation of ordinary borosilicones. Each STPOS molecule has two silanol groups, one at each end. Preferred STPOS polymers include: silanol-terminated polydimethylsiloxanes, formula (I); silanol-terminated diphenylsiloxane-dimethylsiloxane copolymers, formula (II); and silanol-terminated poly trifluoropropylmethylsiloxanes, formula (III). These preferred STPOS are available from Gelest, Inc. and from Emerald Performance Materials.

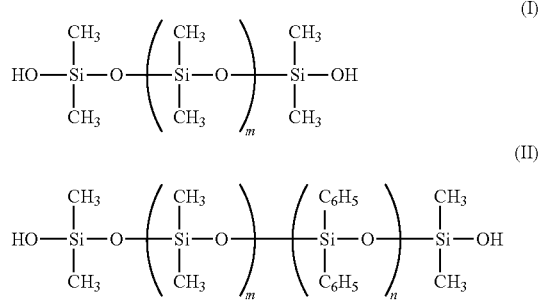

(I)

(II)

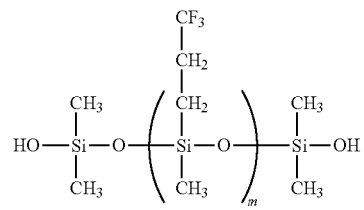

(III)

In formulas (I), (II), and (III), the variables "m" and "n" are both 1 or greater and represent the number of the repeating units in parentheses to give the molecular weight of the particular polymer. Preferred STPOS are those of formula (I), particularly those available from Gelest Inc. identified in Table 1 below, and from Emerald Performance Materials indentified in Table 2 below.

TABLE 1

| Gelest Code | Viscosity (cSt) | Molecular Weight | % (OH) | (OH) - Eq/kg |
|---|---|---|---|---|
| DMS-S12 | 16-32 | 400-700 | 4.5-7.5 | 2.3-3.5 |
| DMS-S14 | 35-45 | 700-1500 | 3.0-4.0 | 1.7-2.3 |
| DMS-S15 | 45-85 | 2000-3500 | 0.9-1.2 | 0.53-0.70 |
| DMS-S21 | 90-120 | 4200 | 0.8-0.9 | 0.47-0.53 |
| DMS-S27 | 700-800 | 18,000 | 0.2 | 0.11-0.13 |
| DMS-S31 | 1000 | 26,000 | 0.1 | 0.055-0.060 |
| DMS-S32 | 2000 | 36,000 | 0.09 | 0.050-0.055 |
| DMS-S33 | 3500 | 43,500 | 0.08 | 0.045-0.050 |
| DMS-S35 | 5000 | 49,000 | 0.07 | 0.039-0.043 |

TABLE 2

| Emerald Code | Viscosity (cSt) |
|---|---|
| SFR 70 | 70 |
| SFR 100 | 100 |
| SFR 750 | 750 |
| SFR 2000 | 2,000 |

Partial crosslinking of these polyorganosiloxanes, including, for example, STPDMS fluids, can produce fluids containing branched siloxane molecules that have 3, 4, 5, or more terminal silanols. These partially crosslinked siloxane fluids can also contain backbone silanols of coordination number 3 or 4, which may be used herein to bind together siloxane chains to form T-branches:

... —O—Si(CH$_3$)(-PDMS-OH)—O— ...

Q-branches:

... —O—Si(-PDMS-OH)$_2$—O— ...

and backbone silanol groups (via hydrolysis of the crosslinking agent):

... —O—Si(CH$_3$)(OH)—O— ...

and

... —O—Si(OH)$_2$—O— ...

The extent of the partial crosslinking that occurs depends on the amount of crosslinking agent used, the presence or absence of crosslinkable groups in the polyorganosiloxane (e.g., the silanol groups and the ethylenically-unsaturated groups), the temperature at which the partial crosslinking occurs, the time allowed for partial crosslinking, the moisture content of the mixture, and the presence or absence of catalyst(s) during partial crosslinking. Partial crosslinking in the presence of moisture encourages the formation of some backbone silanol groups whereas partial crosslinking in the absence of moisture (i.e., in carefully dried materials) encourages the formation of branches.

Partial crosslinking increases the viscosity of the silicone fluid significantly. The viscosity increases gradually as molecules having two crosslinked STPDMS chains form in the fluid. But as larger crosslinked molecules (3, 4, 5, or more STPDMS chains) become common, the fluid's viscosity increases dramatically. Partially crosslinked STPDMS fluids become extraordinarily viscous fluids well before they cross the gelation threshold to form true solids. By controlling the amount of crosslinking agent and the conditions under which crosslinking takes place, partially crosslinked STPDMS fluids can be formed with viscosities ranging from less than 2 times that of the original STPDMS fluid to 1000 or more times that of the original STPDMS fluid. Partially crosslinked STPDMS fluids/semisolids/solids may also be formed in the regimes below, at, and above the gelation threshold.

In another embodiment of the invention, branched polyorganosiloxanes may be formed containing both silanol groups and ethylenically-unsaturated groups, such as, for example, vinyl groups by using, for example, vinyltriacetoxysilane (VTAS), vinyltrimethoxysilane, vinyltrichlorosilane, and/or vinyltriethoxysilane (VTEOS), as crosslinking agents to partially crosslink STPDMS molecules. This partial crosslinking places a vinyl group at each T-branch or backbone silanol group. VTAS is particularly useful for this purpose because it crosslinks STPDMS quickly and without the need for a catalyst, especially at temperatures of 60° C. or more. When the STPDMS has been carefully dried, partial crosslinking with VTAS can produce branched polyorganosiloxanes with multiple terminal silanols. Using these techniques, silicone fluids, semisolids, and solids that have both silanol groups and ethylenically-unsaturated groups, such as, for example, vinyl groups, on their molecules may be formed. Ethylenically-unsaturated groups include any unsaturated chemical compound containing at least one carbon-to-carbon double bond (e.g., alkenyl groups, vinyl groups, vinylidene groups, allyl groups, acrylate groups, methacrylate groups, etc.). U.S. Pat. Nos. 4,360,610 and 5,674,935, the disclosures of which are incorporated by reference, disclose exemplary structures of and methods of making silanol-terminated polyorganosiloxanes containing ethylenically-unsaturated (i.e., vinyl) groups, which may be used in the invention.

The ethylenically-unsaturated group content of the polyorganosiloxane may range from about 0.01 wt % to about 5.0 wt %, preferably from about 0.02 wt % to about 1.0 wt %, and most preferably from about 0.04 wt % to about 0.85 wt %, by weight of the polyorganosiloxane. The silanol content of the polyorganosiloxane may range from about 0.03 wt % to about 7.5 wt %, preferably from about 0.08 wt % to about 4.0 wt %, and most preferably from about 0.09 wt % to about 2.5 wt %, by weight of the polyorganosiloxane.

Partial crosslinking with VTAS proceeds quickly at temperatures of 100° C. or more. Above 100° C., the approximate boiling point of water at sea level, water is able to escape from the silicone fluid rapidly as bubbles of vapor. Partial crosslinking with VTAS proceeds even more quickly at temperatures of 118° C. or more. Above 118° C., the approximate boiling point of acetic acid at sea level, acetic acid is able to escape from the silicone fluid rapidly as bubbles of vapor. Partially crosslinking with VTAS proceeds especially quickly at temperatures of 160° C. or more. See, e.g., Examples 68-73. Preferably, the partial crosslinking with VTAS is done at temperatures ranging from about 125 to 140° C. See, e.g., Examples 74-77.

The viscosity of a partially-crosslinked STPDMS silicone fluid can be increased by the addition of a catalyst(s) and/or other agent(s) that facilitates homocondensation of silanol groups. Because homocondensation of silanol groups reduces the number of silanol groups remaining in the fluid, it increases the effective fraction of crosslinks of the fluid and causes the fluid to approach or even exceed the gelation threshold.

Homocondensation of silanol groups:

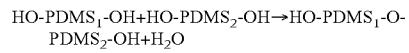

can facilitate the formation of the networks present in a VSR composition of the invention. By reducing the total number of silanol groups and therefore the total chain ends, that homocondensation process effectively increases the ratio of attached chain ends to total chain ends and increases the level of the network formation in the VSR. This homocondensation process can alter a partially crosslinked network that is below the gelation threshold and therefore a liquid, so that that network is above the gelation threshold and therefore a solid.

Because it raises the level of network formation in partially-crosslinked silicones, homocondensation of silanol groups can contribute significantly to the curing and solidification of a VSR of the invention. When a crosslinking agent binds to silanol groups, the amount of that crosslinker can be specified in terms of the percent of initially available silanol groups use to form its crosslinks. 100% of that crosslinker is thus the amount necessary to use all of the initially available silanols—it saturates the silanol. For example, a VSR that originally contains 45% methyltriethoxysilane (MTEOS) and 35% trimethylborate (TMB) is seemingly under-saturated and might be expected to retain 20% of its original silanol groups in their unreacted form. It might also be expected to be a liquid, since 50% MTEOS is required to reach the gelation threshold. However, homocondensation of silanols groups, usually expedited by a catalyst, can eliminate 20% of the original silanol groups so that the resulting VSR is fully saturated. Moreover, its effective MTEOS saturation is then 56%, exceeding the gelation threshold and rendering it a solid. See, e.g., Examples 37 and 52-60.

Sulfuric acid, even in minute amounts and even at room temperature, encourages the homocondensation of silanol groups in partially-crosslinked STPDMS silicone fluids. Removal of the water molecules released by homocondensation further encourages homocondensation. Homocondensation can be terminated by removing or neutralizing the sulfuric acid. See, e.g., Examples 62-67.

Vacuum degassing of a partially-crosslinked STPDMS silicone fluid containing sulfuric acid causes the homocondensation process to proceed more rapidly. By removing accumulated water molecules, that vacuum degassing shifts the equilibrium distribution of silicone molecules in the fluid toward higher molecular weight. See, e.g., Examples 62, 64, and 65.

Permanent Crosslinking Agents

One general embodiment of this invention is the combination of at least one linear and/or branched polyorganosiloxane with two different crosslinking agents—a permanent crosslinking agent and a temporary crosslinking agent. The permanent crosslinking agent forms permanent siloxane and/or carbon crosslinks with the polymers in the polyorganosiloxane. The temporary crosslinking agent forms temporary crosslinks with that same polyorganosiloxane. In a VSR composition of the invention, there must be sufficient permanent crosslinking agent present to establish a robust permanent network and give the rubber composition its permanent equilibrium shape. The amount of temporary crosslinking agent may be varied.

In VSR compositions of the invention, a permanent crosslink can be any chemical linkage that permanently connects polyorganosiloxane chain segments (although a linkage that simply joins two chain segments so that they form a single longer chain segment is a "chain extension" rather than a true crosslink). The conventional curing mechanisms—condensation cure, addition cure, and peroxide cure—all form such chemical linkages between chain segments. Additionally, the branched polyorganosiloxanes effectively have a pre-existing crosslink wherever three or more chain segments meet at a branch point.

The invention can make use of any permanent crosslinking technique or method known in the prior art. In particular, it can make use of condensation-cure crosslinking, addition-cure crosslinking, peroxide crosslinking, as well as other known organo-silicone chemistries, including cures based on isocyanates and epoxies (see, e.g., Examples 26-28, 33-35, 37, and 48).

The permanent crosslinks needed to give a VSR its equilibrium shape and render it a solid can be any of the known crosslinks between polyorganosiloxanes, including siloxane bridges (chain-O—Si—O-chain) and carbon bridges (chain-C-chain, -chain-C—C-chain, chain-C—C—C-chain, etc.). While VSR compositions of the invention based on the condensation cure generally rely on siloxane bridges for permanent crosslinks, VSR compositions of the invention based on the addition cure and on the peroxide cure frequently rely on carbon bridges for permanent crosslinks. See, e.g., Examples 26-28 and 33-35.

The siloxane and carbon bond-forming crosslinking agent may be any crosslinking agent known in the art to crosslink polyorganosiloxanes. Depending on the type of cure used (e.g., condensation, addition, peroxide), for example, one of skill in the art would readily know which permanent crosslinking agent is suitable for creating permanent crosslinks. Suitable siloxane bond-forming crosslinking agents include, for example, polydiethoxysilane (PDEOS), polydimethoxysilane, tetramethoxysilane (TMOS), tetraethoxysilane (TEOS), MTEOS, methyltrimethoxysilane, tetra-n-propoxysilane, vinyltriacetoxysilane (VTAS), methyltriacetoxysilane, ethyltriacetoxysilane, tetrakis(methoxyethoxy)silane, vinyltrichlorosilane, methyltrichlorosilane, ethyltrichlorosilane, tetrachlorosilane, polymethylhydrosiloxane (PMHS), methylhydrosiloxane-dimethylhydrosiloxane copolymer (PMHS-PDMS), hydride-terminated polymethylhydrosiloxane, and hydride-terminated methyl hydrosiloxane-dimethylhydrosiloxane copolymer. Siloxane bond-forming crosslinking agents are available from Gelest, Inc., Sigma-Aldrich, Alfa-Aesar, and Emerald Performance Materials. Suitable carbon bond-forming crosslinking agents include, for example, polymethylhydrosiloxane (PMHS), methylhydrosiloxane-dimethylhydrosiloxane copolymer (PMHS-PDMS), hydride-terminated polymethylhydrosiloxane, hydride-terminated methylhydrosiloxane-dimethylhydrosiloxane copolymer, benzoyl peroxide, 2,4-dichlorobenzoyl peroxide (DCBP), dicumyl peroxide (DCP), and 2,5-bis(tert-butylperoxy)-2,5-dimethylhexane (VX). Carbon-bond-forming agents are available from Gelest, Inc., Sigma-Aldrich, Alfa-Aesar, Arkema, Inc., and Emerald Performance Materials. The amount of a particular siloxane and/or carbon bond-forming crosslinking agent used depends upon the number of functional groups within the crosslinking agent. The amount of the crosslinking agent must be sufficient to yield a permanent equilibrium shape but generally in less than the amount sufficient to react with all of the silanol and carbon groups, so that some silanol and carbon groups are available to form temporary crosslinks. The permanent crosslinking agent may be present in the VSR compositions of the invention in an amount ranging from about 0.02 wt % to 20.0 wt %, such as, for example, from about 0.04 wt % to about 15.0 wt %, such as, for example, from about 0.08 wt % to about 8.0 wt %, based on the total weight of the VSR composition. Preferably, the permanent crosslinking agent may be present in the VSR compositions of the invention in an amount ranging from about 0.1 wt % to about 5.0 wt %, based on the total weight of the VSR composition.

In another embodiment, the permanent crosslinks need not be formed using a permanent crosslinking agent. Rather, some or all of the permanent crosslinks creating chemical linkages that permanently connect polyorganosiloxane chain segments may be formed through means other than a permanent crosslinking agent. The permanent crosslinks may be created through the presence of at least one permanent crosslinkable group present in the polyorganosiloxane, such as, for example, a polyorganosiloxane comprising at least one ethylenically-unsaturated group. In the peroxide cure, for example, a free radical may attack the carbon-carbon double bond in the ethylenically-unsaturated group and cause those carbons to grab onto another polyorganosiloxane chain (e.g., via self-crosslinking). Alternatively, any process applied to the polyorganosiloxanes that creates permanent crosslinks between the polyorganosiloxane chains may be used to make some or all of the permanent crosslinks. For example, the application of any electromagnetic radiation (e.g., microwave, near infrared, ultraviolet, x-ray, gamma rays, high-energy gamma rays, etc.) may cause permanent crosslinks to form between some polyorganosiloxanes. Any catalyst that causes the polyorganosiloxanes to form permanent crosslinks, such as, for example, platinum, may be used to make some or all of the permanent crosslinks.

Any combination of the above-mentioned means for creating permanent crosslinks between polyorganosiloxane chains may be used in the invention. Thus, any permanent crosslinking agent, crosslinkable group present in the polyorganosiloxane, process, or catalyst that produces permanent crosslinks between polyorganosiloxanes to give the material a permanent equilibrium shape may be used.

Temporary Crosslinking Agents

In a VSR composition of the invention, a temporary crosslink can be any chemical linkage that temporarily connects polyorganosiloxane chain segments. Temporary crosslinking agents may be based on boron, tin, titanium, aluminum, zirconium, arsenic, lead, and phosphorous atoms. In particular, linkages that can serve as temporary crosslinks in VSR compositions of the invention include, but are not limited to, -oxygen-boron-oxygen- bridges, -oxygen-titanium-oxygen- bridges, and -oxygen-aluminum-oxygen- bridges.

In a VSR composition of the invention, at least one boron-containing compound is present in an amount to provide sufficient temporary crosslinks to give the composition a resilience during impact that increases with the speed of that impact. In another VSR composition of the invention, the composition comprises at least about 0.1 wt % of at least one boron-containing compound and exhibits a stiffness that is greater on short timescales than it is on long timescales and a resilience during impact that increases with the speed of that impact.

The boron-containing crosslinking agent may be, for example, boric acid (BA) or a boric acid ester such as TMB, triethyl borate (TEB), triisopropyl borate (TIB), and tributyl borate. Due to their chemical structure, boron-containing crosslinking agents have three functional groups by which to react with the silanol groups in the polyorganosiloxane. The use of a boron compound as the temporary crosslinking agent has an additional consequence: this material embodiment of the invention typically exhibits a remarkably high stiffness and resiliency in response to sudden impacts.

In one embodiment, the branched polyorganosiloxanes having more than two silanol groups can combine with boron compounds to form novel borosilicones, titanium compounds to form novel titanosilicones, aluminum compounds to form novel aluminosilicones, or mixtures thereof (e.g., borotitanosilicones). Borosilicones of the invention, for example, are less soluble in alcohols and other solvents than ordinary STPDMS-based borosilicones and that they retain their viscoelastic properties better than do ordinary borosilicones when exposed to moisture or liquid water.

When adding silanol groups to a STPDMS chain, each silanol group can be placed along the backbone of the polydimethylsiloxane (PDMS) chain:

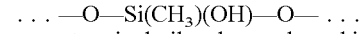
... —O—Si(CH$_3$)(OH)—O— ...

or as a terminal silanol on a branching PDMS chain segment:

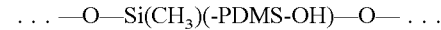
... —O—Si(CH$_3$)(-PDMS-OH)—O— ...

Both types of additional silanol groups contribute to the bonding of borosilicones. Branched PDMS molecules that have 3, 4, 5, or more terminal silanols can combine with boron compounds to form novel borosilicones having greater tensile strengths and more resistance to solvents than ordinary STPDMS-based borosilicones.

In another embodiment, a wide range of linear and/or branched polyorganosiloxanes having silanol groups and ethylenically-unsaturated groups on some, most, or all of their molecules can be combined with a wide range of boron compounds to form vulcanizable borosilicones—borosilicone compounds that can be vulcanized (i.e., permanently crosslinked to form solids). In addition to partially-crosslinked STPDMS fluids, a more general class of polyorganosiloxanes having both ethylenically-unsaturated groups and silanol groups along their backbones and/or at their chain-ends could be synthesized by persons knowledgeable in the art. Such molecules may be linear or branched and they could have the ethylenically-unsaturated and silanol groups distributed in many different ways. Borosilicones formed from these polyorganosiloxanes may be turned into VSR compositions of the invention via, for example, the peroxide cure, the addition cure at room temperature, and the addition cure at elevated temperature.

Vulcanizable partially crosslinked borosilicones (VPCBs) may be prepared from silanol-containing, partially-crosslinked, branched STPDMS silicones containing ethylenically-unsaturated groups by reacting them with, for example, trimethyl borate (TMB). These borosilicones may be vulcanized to form VSR compositions of the invention via, for example, the peroxide cure, the addition cure at room temperature, and the addition cure at elevated temperature.

As discussed below, the vulcanizable borosilicones may also be combined with many other materials prior to vulcanization, notably with reinforcing fillers (e.g., hexamethyldisilazane-treated fume silica (TFS) and Garamite 1958 (G1958)), with conventional methyl vinyl silicone fluids and/or high-temperature vulcanizing silicones (HCR silicones) (e.g., Wacker R401/50), and with conventional STP-DMS-based borosilicones (e.g., 100% TMB in 90-120 cSt STPDMS), as well as with combinations thereof. VSRs of the invention may be formed from those combinations. These blended materials vulcanize to form VSRs of the invention with excellent properties. Adding HCR silicone can greatly increase the maximum elongation, tear resistance, and tensile strength of the resulting VSR. Adding up to 25 wt % or more conventional STPDMS-based borosilicones accentuates the difference between the short timescale stiffness and long timescale stiffness of the resulting VSR.

In another embodiment, borosilicones and vinyl-methyl silicone fluids and/or HCR silicones can be blended together and then vulcanized, using either the peroxide cure or the addition cure, to produce VSRs of the invention. The vinyl-methyl silicone fluids and/or HCR silicones should be at least 10 weight percent of the blend and preferably at least 25 weight percent of the blend. The resulting VSRs of the invention have large elongations at break and are relatively resistant to tearing. See, e.g., Examples 7-13 and 41-43.

In addition, blends of branched borosilicones with vinyl-methyl silicone fluids and/or HCR silicones can be vulcanized by the addition cure or the peroxide cure combined with the condensation cure. See, e.g., Example 45. These blends can also be vulcanized into foamed VSR of the invention, using any of the known techniques for making foamed silicone rubbers and viscoelastic silicone rubbers. See, e.g., Example 44.

Blends of (a) branched borosilicones, titanosilicones, aluminosilicones, and/or mixtures thereof (e.g., borotitanosilicones) and (b) conventional vulcanizable silicones such as HCR compositions and methyl-vinyl silicone fluids can be vulcanized to produce VSR of the invention. VSR of the invention may be prepared from these pairings using both the peroxide cure (e.g., with 2,5-bis(tert-butylperoxy)-2,5-dimethylhexane (Luperox® 101) crosslinker and heat) and the addition cure (e.g., with polymethylhydrosiloxane crosslinkers and Pt-complex).

A borosilicone formed from branched polyorganosiloxanes with more than two silanol groups on some, most, or all of their molecules can be vulcanized via the condensation reaction. When suitable catalyst(s) and/or suitable crosslinking agent(s) are added to the borosilicone, remaining silanol groups in the borosilicone as well as silanol groups formed via hydrolysis of -oxygen-boron-oxygen- bridges can condense to form permanent -oxygen-silicon-oxygen- linkages.

A partially-crosslinked borosilicone fluid (a close relative to a VSR in which the permanent network is not quite extensive enough to give the composition a permanent equilibrium shape) can be transformed into a VSR through homocondensation of silanol groups. Generally, this homocondensation is initiated by the addition of a catalyst and may or may not be accompanied by a crosslinking agent. See, e.g., Example 37. For example, adding AMA (Aero-Marine Silicone Accelerator) to a borosilicone based on partially crosslinked STPDMS can cause that borosilicone to solidify into a VSR.

Titanium and/or aluminum compounds can substitute for some or all of the boron compounds as temporary crosslinkers in VSR compositions of the invention. VSR of the invention using titanium compounds (e.g., a titanium alkoxides, such as titanium isopropoxide (TIP), titanium butoxide, titanium methoxide, titanium ethoxide, and titanium propoxide, titanium dibutoxide(bis-2,4-pentanedionate), titanium diisopropoxide(bis-2,4-pentanedionate), titanium diisopropoxide(bis-ethylacetoacetate), titanium 2-ethylhexoxide, titanium trimetylsiloxide, polydibutyltitanate, and diethoxysiloxane-ethyltitanate copolymer) and/or aluminum compounds (e.g., aluminum alkoxides, such as aluminum propoxide, aluminum isopropoxide, aluminum butoxide, aluminum methoxide, and aluminum ethoxide, and diethoxysiloxane-butylaluminate copolymer) as temporary crosslinkers may be made as well as VSRs using mixtures of boron, titanium, and/or aluminum compounds as temporary crosslinkers. In general, any borosilicone or VSR based on boron can also be formulated using titanium and/or aluminum in place of some or all of the boron in that material. For example, titanium bridges (chain-O—Ti—O-chain) and/or aluminum bridges (chain-O—Al—O-chain) can act as temporary crosslinks between polyorganosiloxanes and these titanium and/or aluminum bridges can replace some or all of the boron bridges (chain-O—B—O-chain) in VSR of the invention. See, e.g., Example 14 and 15.

A VSR composition of the invention contains both permanent and temporary crosslinks. For the permanent crosslinking agent, the minimum amount of crosslinking is set by the need to exceed the gelation threshold. For the temporary crosslinking agent, however, the minimum amount is set only by the desired degree of temporary crosslinking. It is preferable for the temporary crosslinking agent, possibly assisted by the permanent crosslinking agent, to use approximately 100% of the silanol groups on the polyorganosiloxane—that is, to reach approximately 100% saturation of the silanol groups. That amount is generally at least 0.005 wt %, or at least 0.1 wt %. Greater amounts of temporary crosslinking agents may be used and depend upon the composition and properties desired for the particular VSR composition. The temporary crosslinking agent may be present in the VSR compositions of the invention in an amount ranging from about 0.01 wt % to 20.0 wt %, such as, for example, from about 0.05 wt % to about 15.0 wt %, such as, for example, from about 0.08 wt % to about 12.0 wt %, based on the total weight of the VSR composition. Preferably, the temporary crosslinking agent may be present in the VSR compositions of the invention in an amount ranging from about 0.1 wt % to about 11.0 wt %, and, more preferably, from about 0.3 wt % to about 2.5 wt %, based on the total weight of the VSR composition.

Softening Agents

The temporary crosslinks, for example, the boron crosslinks (-oxygen-boron-oxygen- bridges), between branched polyorganosiloxanes in VSR compositions of the invention can be extremely long-lived in the absence of reactive chemicals or chemical groups in the temporary crosslinker-silicone composition (e.g., boron-silicone composition). For example, an extremely pure borosilicone composition—one that is essentially free of moisture, alcohols, carboxylic acids, and silanol groups—exhibits behavior that is difficult to distinguish from that of a conventionally crosslinked silicone composition when studied on relatively short timescales, such as seconds, minutes, hours, or even longer, near room temperature.

When there is a complete absence of chemicals that can react with and thereby open boron bridges (chain-oxygen-boron-oxygen-chain), the boron-based crosslinks in VSR compositions of the invention are effectively permanent near room temperature. Without such boron-bridge-opening-chemicals, the boron linkages rarely open near room temperature. Therefore, VSR compositions of the invention that are approximately devoid of those chemicals are approximately elastic (rather than viscoelastic) on timescales of 1 minute or less. See, e.g., Examples 48 and 59. Elevated temperatures (e.g., 160° C. or greater), however, can soften these borosilicones, i.e., open the boron linkages.

If chemicals (i.e., softening agents) that can open a boron bridge (chain-oxygen-boron-oxygen-chain) are present, the boron-based crosslinks in VSR compositions of the invention are effectively temporary near room temperature. Such boron-bridge-opening-chemicals include, but are not limited to, water, alcohols, polyols, silanols, and carboxylic acids. See, e.g., Examples 1-13, 48, and 60. Thus, in one embodiment, the VSR compositions of the invention may comprise at least one softening agent present in an amount sufficient to make the average lifetime of the temporary crosslink of shorter duration than the average lifetime of the temporary crosslink in the absence of the softening agent.

Including softening agents that are reactive with the temporary crosslinks, such as, for example, boron crosslinks, (e.g., moisture, alcohols, carboxylic acids, and unreacted silanol groups) in a VSR composition hastens stress relaxation in that composition. Those added chemicals soften the VSR on timescales that are sensitive to the rate at which the temporary crosslinks open. At the very shortest timescales, the temporary crosslinks are so unlikely to open that there is little opening-rate sensitivity. At the very longest timescales, the temporary crosslinks are so likely to open that there is again little opening-rate sensitivity. But at intermediate timescales, wherein the temporary crosslinks may or may not open to relax stress, increasing the opening rate with chemicals will increase the probability of stress relaxation and thereby soften the composition.

For VSR compositions of the invention to exhibit significant viscoelasticity on timescales of 1 minute or less, those materials generally should contain boron-bridge-opening-chemicals so that those boron-based crosslinks behave as temporary crosslinks. Those boron-bridge-opening-chemicals may be added explicitly to the VSR compositions of the invention, before, during, or after curing. Those boron-bridge-opening softening agents may also be present naturally in the original chemicals used to form the VSR compositions of the invention, as impurities or additives in those chemicals, as reaction or decay products, or in the environments to which the VSR compositions of the invention are exposed. See, e.g., Examples 1-13, 48, and 60.

Chemicals bearing hydroxyl and carboxyl groups are particularly effective boron-bridge-opening-chemicals. Water, alcohols, polyols, silanols, and carboxylic acids are examples of chemicals bearing hydroxyl and carboxyl groups. See, e.g., Examples 1-13, 48, and 60. For example, alkyl alcohols, alkenyl alcohols, polyalkenyl alcohols, aryl alcohols, monols, diols, and triols, each of which containing from 1 to 30 carbon atoms, including their isomers, may be effective as softening agents. Furthermore, for example, alkyl carboxylic acids, alkenyl carboxylic acids, polyalkenyl carboxylic acids, aryl carboxylic acids, mono-, di-, and tri-carboxylic acids, each of which containing from 1 to 30 carbon atoms, including their isomers, may be effective as softening agents. Carboxylic acids are particularly effective as softening agents. Less than 0.1 wt % carboxylic acid can noticeably reduce the stiffness of a VSR.

Boron-bridge-opening-chemicals are most effective at facilitating the opening and closing of boron bridges in VSR compositions of the invention when those chemicals remain in the silicone phase—that is, when they do not phase-separate because of chemical incompatibility or undergo a phase-change to solid or gas. In other words, a preferred boron-bridge-opening-chemical is one that (1) is miscible in VSR compositions of the invention, (2) has a low melting temperature, and (3) has a low vapor pressure. See, e.g., Examples 1-13, and 60.

Many primary alcohols and carboxylic acids (i.e., hydrocarbons having a single hydroxyl or carboxyl group) are miscible in silicones and thus satisfy (1). Also, many or most silicones having one or more silanol (Si—OH), carbinol (C—OH), and/or carboxyl groups satisfy (1). Examples include primary alcohols such as, for example, 2-propanol, hexanol, decanol, 2-ethylhexanol, lauryl alcohol, stearyl alcohol, oleyl alcohol, and isostearyl alcohol, carboxylic acids such as, for example, acetic acid, 2-ethylhexanoic acid, lauric acid, stearic acid, oleic acid, and isostearic acid, and silicones such as, for example, silanol-terminated polydimethylsiloxanes. See, e.g., Examples 1-13, and 60.

Satisfying (2) and (3) simultaneously requires more careful selection of chemicals. That is because lower-molecular-weight alcohols and carboxylic acids are often liquid at the relevant temperatures, but have substantial vapor pressures, whereas higher-molecular-weight alcohols and carboxylic acids are often solid at the relevant temperatures. Fortunately, higher-molecular-weight alcohols and carboxylic acids that have branched chains and/or carbon-carbon double bonds tend to be liquid at relevant temperatures yet have low vapor pressures. Examples include primary alcohols such as, for example, 2-ethylhexanol, oleyl alcohol, linoleyl alcohol, 2-hexyldecanol, and isostearyl alcohol, and carboxylic acids such as, for example, 2-ethylhexanoic acid, oleic acid, linoleic acid, 2-hexyldecanoic acid, and isostearic acid. See, e.g., Examples 1-13, and 60.

Double bonds are chemically fragile and can be damaged by light and chemicals. In one embodiment, the boron-bridge-opening-chemicals have no carbon-carbon double bonds and thus high chemical stability. They are higher-molecular-weight, fully saturated fatty alcohols and carboxylic acids that are branched or that are branched with multiple branch-points so that they remain liquid even at the lowest temperatures to which the materials of this invention will be subjected and yet have low vapor pressures. Examples include primary alcohols such as, for example, 2-ethylhexanol, 2-hexyldecanol, and isostearyl alcohol, and carboxylic acids such as, for example, 2-ethylhexanoic acid, 2-hexyldecanoic acid, and isostearic acid. See, e.g., Examples 1-13, and 60.

Examples of isostearyl alcohol and isostearic acid are available as synthetic products of Nissan Chemical America Corporation. They remain liquid down to extremely low temperatures yet have very low vapor pressures. They are odorless, safe, and miscible with silicones. They diffuse easily into cured VSR compositions of the invention and do not exude from those VSR of the invention. The four commercial compounds are:

| | |
|---|---|
| Iso-Stearyl Alcohol FO-180<br>Melting Point: < −90° C.<br>Boiling Point: 295° C. | 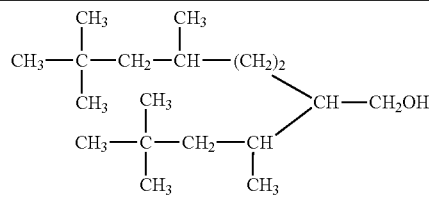 |
| Iso-Stearyl Alcohol FO-180N<br>Melting Point: < −30° C.<br>Boiling Point: 306° C. | 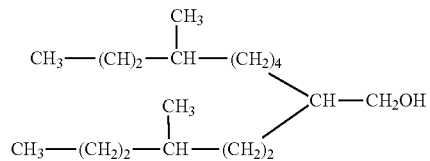 |
| Iso-Stearic Acid<br>Melting Point: < −70° C.<br>Boiling Point: 311° C. | 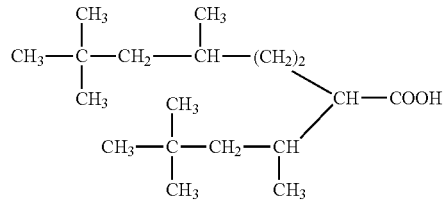 |
| Iso-Stearic Acid N<br>Melting Point: < −30° C.<br>Boiling Point: 320° C. | 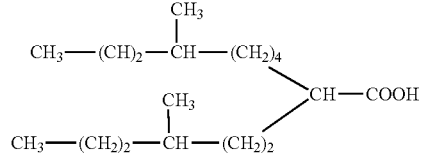 |

Another preferred softening agent that may be included is unsaturated oleic acid, despite containing a double bond, which reduces its chemical stability. See, e.g., Examples 1, 2, and 74-77.

Arizona Chemicals also produces an isostearic acid blend as their product "Century 1105." Century 1105 is less preferred as a boron-bridge-opening-chemical because it tends to exude from finished VSR compositions of the invention and freezes at 4° C. Nonetheless, this Arizona saturated fatty acid is likely more chemically stable than the unsaturated oleic acid. See, e.g., Example 49.

While water is not very miscible in VSR compositions of the invention and has a high vapor pressure, its abundance in the atmosphere and in some of the environments to which VSR compositions of the invention are exposed can maintain its concentration in VSR compositions of the invention so that it acts as an important boron-bridge-opening-chemical. See, e.g., Example 48. Water may also hydrolyze esters that may have formed in the VSR of the invention and thus reduce the availability of other softening agents. By releasing those softening agents from their ester form, water increases their effectiveness at softening the VSR.

Volatile boron-bridge-opening-chemicals are useful during the preparation and molding of VSR compositions of the invention and to temporarily reduce the viscosities of borosilicones. By increasing the rates of opening and closing of the boron-based temporary crosslinks, these chemicals allow uncured VSR compositions of the invention to flow more easily through processing and molding equipment. Once the volatile chemicals have evaporated, they no longer have any effect on the VSR compositions of the invention. Similarly, these chemicals reduce the viscosities of borosilicones only until they evaporate, after which they have no effect on the borosilicones. See, e.g., Example 46 and 53-60. For example, acetic acid is particularly effective as a temporary softening agent that makes compounding, processing, and molding the constituents of a VSR much easier. See, e.g., Examples 29-32, 41-44, 46, 48, 53-60, and 62. This temporary softening disappears once the acetic acid has evaporated or otherwise left the finished VSR.

The softening agents may be present in any amount sufficient to make the average lifetime of the temporary crosslink of shorter duration than the average lifetime of the temporary crosslink in the absence of the softening agent. For example, the softening agent may be present in the VSR compositions of the invention in an amount ranging from about 0.01 wt % to 5.0 wt %, such as, for example, from about 0.02 wt % to about 4.0 wt %, such as, for example, from about 0.03 wt % to about 3.0 wt %, based on the total weight of the VSR composition. Preferably, the softening agent may be present in the VSR compositions of the invention in an amount ranging from about 0.05 wt % to about 2.0 wt %, based on the total weight of the VSR composition. In other cases, the softening agents may be present in even lower amounts. For example, when atmospheric water from the environment is used as the softening agent, less than about 0.01 wt % may be present and still have a softening effect. Acetic acid may be present in amount less than about 0.01 wt % and still have a softening effect. Heavy acids, such as oleic acid and isostearic acid, may be present in an amount as high as about 2.0 wt %, but more preferably, about 1.2 wt %, and even more preferably, about 0.8 wt % or less, may be used to render a softening effect.

Catalysts, Moderators, Accelerators, Additives, and Fillers

In addition to the softening agents mentioned above, the VSR compositions of the invention may also include any catalysts, moderators, accelerators, additives, and fillers known for use with silicone rubber compositions such as those discussed above. Catalysts that may be used in condensation-cure silicones include, but, are not limited to, tin and titanium catalysts (e.g., dibutyldilauryltin, bis(2-ethylhexanoate)tin, titanium dibutoxide(bis-2,4-pentanedionate), and titanium diisopropoxide(bis-2,4-pentanedionate)), and associated accelerators (e.g., AeroMarine Accelerator). Catalysts that may be used in addition-cure silicones include, but, are not limited to, platinum and rhodium catalysts (e.g., chloroplatinic acid, Karstedt catalyst (platinum-divinyltetramethyldisiloxane complex), Ossko catalyst (platinum carbonyl cyclovinylmethylsiloxane complex), Lamoreaux catalyst (platinum-octanaldehyde/octanol complex), and tris(dibutylsulfide)rhodium trichloride)), and associated moderators (e.g., 1,3-divinyltetramethyldisiloxane, 1,3,5,7-tetravinyl-1,3,5,7-tetramethylcyclotetrasiloxane).

A condensation-cure catalyst may be present in the VSR compositions of the invention in an amount ranging from about 0.001 wt % to about 10.0 wt %, such as, for example, from about 0.005 wt % to about 8.0 wt %, such as, for example, from about 0.01 wt % to about 6.0 wt %, based on the total weight of the VSR composition. Preferably, a condensation-cure catalyst may be present in the VSR compositions of the invention in an amount ranging from about 0.05 wt % to about 4.0 wt %, based on the total weight of the VSR composition. An addition-cure catalyst may be present in the VSR compositions of the invention in an amount, based on the catalyst's precious metal content (e.g., platinum and rhodium) alone, ranging from about 0.5 ppm to about 500 ppm, such as, for example, from about 1 ppm to about 100 ppm, such as, for example, from about 2 ppm to about 50 ppm, based on the total weight of the VSR composition. Preferably, an addition-cure catalyst may be present in the VSR compositions of the invention in an amount ranging from about 3 ppm to about 30 ppm, based on the total weight of the VSR composition. The peroxide crosslinking agent used in peroxide-cure silicones is normally activated by heat rather than a catalyst, but it is also possible to include a catalyst to assist the reactions. The accelerators may be present in the VSR compositions of the invention in an amount ranging from about 0.01 wt % to 6.0 wt %, such as, for example, from about 0.02 wt % to about 5.0 wt %, such as, for example, from about 0.04 wt % to about 4.0 wt %, based on the total weight of the VSR composition. Preferably, the accelerator may be present in the VSR compositions of the invention in an amount ranging from about 0.1 wt % to about 3.3 wt %, based on the total weight of the VSR composition. The moderators, which are optional, may be present in the VSR compositions of the invention in an amount ranging from about 0.001 wt % to 1.0 wt %, such as, for example, from about 0.005 wt % to about 0.5 wt %, such as, for example, from about 0.01 wt % to about 0.2 wt %, based on the total weight of the VSR composition. Preferably, the moderator may be present in the VSR compositions of the invention in an amount ranging from about 0.02 wt % to about 0.1 wt %, based on the total weight of the VSR composition.

Peroxides, such as, for example, DCP and VX, may be present in the VSR compositions of the invention in an amount ranging from about 0.05 wt % to about 5.0 wt %, such as, for example, from about 0.1 wt % to about 4.0 wt %, such as, for example, from about 0.2 wt % to about 3.0 wt %, based on the total weight of the VSR composition. Preferably, a peroxide may be present in the VSR compositions of the invention in an amount ranging from about 0.4 wt % to about 2.0 wt %, based on the total weight of the VSR composition. Peroxides can be considered crosslinking agents or as agents that initiate crosslinking.

Fillers may be used in an amount up to about 80 wt % of rubber composition. For example, the filler may be present in the VSR compositions of the invention in an amount ranging from about 1.0 wt % to 80.0 wt %, such as, for example, from about 2.0 wt % to about 50.0 wt %, such as, for example, from about 5.0 wt % to about 40.0 wt %, based on the total weight of the VSR composition. Preferably, the filler may be present in the VSR compositions of the invention in an amount ranging from about 8.0 wt % to about 30.0 wt %, based on the total weight of the VSR composition. As is known in the art the amount of filler used will depend on the particular filler and the desired end use of the VSR composition. For example, a VSR composition of the invention may contain a reinforcing filler such as fumed silica or clay particles. Hexamethylenedisilazane treated fumed silicas from Gelest, Inc., and from Cabot Corp. are preferred reinforcing fillers as are the Garamite clays from Southern Clay Products. Reinforcing fillers may also include, for example, fumed alumina, fumed titania, calcium metasilicate, and silicon dioxide. Density-reducing fillers such as microballoons or microspheres, e.g., Expancel microspheres from AkzoNobel may also be used. The amount of density-reducing fillers depends upon the desired density of the final product. Other traditional fillers such as pigments, insulators, and other inorganic fillers may be used as known in the art.

Adding one or more mixed mineral thixotropes (MMTs), such as, for example, Garamite 1958 or Garamite 2578 (Southern Clay Products), as an additive to VSR compositions of the invention greatly increases the viscosity of uncured VSR compositions of the invention and renders that fluid thixotropic. MMTs also increase the tensile strengths and tear strengths of VSR compositions of the invention when those MMTs are added as reinforcing fillers. Dispersing additives such as MMTs can be done effectively using an ordinary blender or immersion blender. The dispersed MMTs (e.g., Garamite 1958 or Garamite 2578) acts as reinforcing filler for the VSR compositions of this invention. For example, adding 5 wt % or more MMTs, such as Garamite 1958 to STPDMS, may substantially increase the elastic modulus, viscous modulus, tensile strength, and tear resistance of VSR compositions of the invention. When MMTs are added in the amount of 10 weight percent or more, the increases in tensile strength and tear strength may be very significant. For example, adding 12.5 wt % or more Garamite 1958 to STPDMS is particularly effective at increasing the elastic modulus, viscous modulus, tensile strength, and tear resistance of a VSR composition of the invention made from that STPDMS.

MMTs, such as, for example, Garamite 1958 and Garamite 2578, are most effective at increasing the tensile strength and tear strength of VSR compositions of the invention when the MMT(s) are first blended into the silicone base and then heat-treated to evaporate a substantial fraction of the water present in the pre-heat-treated blend. The heat-treatment can be done at a temperature between 50 and 220° C., but is preferably done at a temperature between 150 and 200° C. Heat-treatment is particularly effective when the MMT-silicone blend is heated as a thin layer for between 1 and 20 minutes, so that the water is able to evaporate easily and thoroughly from the mixture. VSR compositions of the invention made from MMT-silicone blends that have been heat-treated as thin layers at between 150 and 200° C. for between 1 and 20 minutes have particularly large tensile strengths and tear resistances. See, e.g., Example 2.

When a blend consisting of MMTs dispersed in STPDMS is heated as a thin layer to temperatures ranging from 50° C. to 220° C., moisture is visibly driven out of the blend and the blend's viscosity and thixotropy both increase substantially. This heat treatment is particularly effective when care is taken not to evaporate or sublime a significant fraction of the quaternary ammonium compound(s) contained in the MMTs. Blending from 12.5 wt % to 20 wt % Garamite 1958 in 90-120 cSt STPDMS and then heat-treating that blend at 150° C. to 200° C. produces an exceptionally viscous and thixotropic fluid.

Heat-treated blends of MMTs in STPDMS produce VSR compositions of the invention with excellent characteristics and that heat treatment of a dispersion of MMT in STPDMS can increase the elastic modulus, viscous modulus, tensile strength, and tear resistance of the resulting viscoelastic rubber. Heat-treated blends of 12.5 wt % to 20 wt % Garamite 1958 in 90-120 cSt STPDMS produce VSR compositions of the invention with exceptionally large elastic moduluses, viscous moduluses, tensile strengths, and tear resistances. Even when heat-treated blends of MMTs in STPDMS incorporating other materials, such as plastic microspheres, they can still form VSR compositions of the invention with increased elastic moduluses, viscous moduluses, tensile strengths, and tear resistances.

Vulcanizable borosilicones of the invention can produce foamed VSR compositions of the invention when blowing agents, such as, for example, AkzoNobel Expancels, sodium bicarbonate, acodicarbonamide, Exocerol®, Hydrocerol®, Nitrosan®, dinitropentamethylenetetramine, p-tolylsulfonylhydrazide, 4,4-oxybis(benzylsulfonylhydrazide), 5-phenyhetrazol, and p-tolylsulfonylsemicarbazide, are incorporated into them prior to vulcanization. Those blowing agents can be expanded prior to or during the vulcanization process. A blowing agent may be present in the VSR compositions of the invention in an amount ranging from about 0.01 wt % to 10.0 wt %, such as, for example, from about 0.02 wt % to about 5.0 wt %, such as, for example, from about 0.04 wt % to about 4.0 wt %, based on the total weight of the VSR composition. Preferably, a blowing agent may be present in the VSR compositions of the invention in an amount ranging from about 0.1 wt % to about 3.0 wt %, based on the total weight of the VSR composition.

In one embodiment, vulcanizable borosilicones of the invention can produce foamed VSR compositions of the invention when compounds containing hydroxyl group(s) (e.g., water, alcohols, carboxylic acids, silanols) are incorporated into them prior to addition-cure vulcanization. Those hydroxyl groups react with hydrosiloxanes to release hydrogen gas, which foams the VSR, or esterify to release water, which may then foam the VSR.

In another embodiment, vulcanizable borosilicones of the invention can produce foamed VSR compositions of the invention when a gas (e.g., nitrogen) is dissolved into the borosilicone at high pressure and that pressure is abruptly released just prior to vulcanization. The dissolved gas comes out of solution and foams the VSR.

Furthermore, microencapsulated permanent crosslinking agents, peroxides, and/or catalysts can be embedded in the viscoelastic silicone rubbers of this invention to render them self-healing. When the silicone rubber of the invention is torn by impact or excessive strain, the microencapsulated permanent crosslinking agent and/or catalyst is released locally. That agent and/or catalyst then forms new permanent crosslinks that bridge the tear and reestablished the network of permanent crosslinks. This self-healing process takes advantage of the reactive sites that appear whenever temporary crosslinks open. Permanent crosslinks will replace temporary crosslinks in the vicinity of the tear, healing the tear. It also takes advantage of the fact that the temporary crosslinks will hold the two sides of the tear together during the permanent crosslinking process.

Passivating Agents

The surface of a VSR of the invention can be passivated (i.e., rendered nonself-sticky) in one of several ways: (1) by exposing that surface to titanium compounds, such as, for example, titanium (IV) isopropoxide (see, e.g., Example 47), (2) by exposing that surface to condensation-cure catalysts such as, for example, AeroMarine Silicone Accelerator, with or without additional condensation-cure crosslinking agents, and/or (3) by coating that surface with condensation-cure silicone rubber formulations such as, for example, Wacker A07 or Dow Corning 734. Silicone-organic surfactants that tend to phase separate from silicones can be used to coat and passivate the surfaces of VSR compositions of the invention as well. See, e.g., Example 61.

Methods of Preparation

The VSR compositions may be prepared using the same techniques known to prepare other silicone rubber compositions. For example, VSR compositions of the invention can be made using any of the known silicone crosslinking and curing chemistries, including condensation cure, addition cure, and peroxide cure silicone chemistries, as well as all other known organo-silicone chemistries, including cures based on isocyanates and epoxies. See, e.g., Examples 26-28 and 33-35. Catalysts and/or peroxides known in the art may be used and in similar amounts as with other silicone rubber compositions. Various methods of preparing the VSR compositions are described in the examples below.

VSR compositions of the invention that form permanent crosslinks using the condensation cure can proceed without catalysts. For example, acetoxy groups bound to silicon atoms can react with silanol groups in the absence of catalysts. See, e.g., Examples 26-28 and 33-35.

In one method to prepare a VSR composition of the invention, the polyorganosiloxane base may first be reacted with a temporary crosslinking agent, such as, for example, a boron-containing crosslinking agent, under conditions to produce a borosilicone compound. This establishes the temporary crosslinking network within the composition. The reaction between the silanol groups and the boron-containing crosslinking compound is rapid, such that when the silanol-terminated polyorganosiloxane base is combined with both crosslinking agents the temporary crosslinking network will form before the permanent crosslinking network. To establish the permanent crosslinking network a siloxane and/or carbon bond-forming crosslinking agent and an optional catalyst are added to the borosilicone compound to form a mixture. That mixture may optionally include a filler and/or a solvent for one or more components. In some instances the borosilicone compound is itself still a liquid (its gel point is not reached) and the other reactants can be directly added to the liquid borosilicone compound. The mixture is then cured under conditions sufficient to form a VSR composition. The curing step typically takes place in a mold so that the mixture is placed in a mold and then cured to establish its permanent equilibrium state. The VSR compounds of the invention may be molded into any desired shape. Alternatively, and with the various embodiments mentioned, a VSR composition of the invention may also be prepared by: combining a silanol-terminated polyorganosiloxane base with a siloxane and/or carbon bond-forming crosslinking agent, a catalyst, an optional filler, and an optional foaming agent to form a mixture; adding a boron-containing crosslinking agent to the mixture; and curing the mixture under conditions sufficient to form a VSR composition.

In another embodiment, two-part RTV and HTV viscoelastic silicone rubbers can be formulated by separating the chemicals necessary to form viscoelastic silicone rubbers into two stable groupings—groupings that do not cure independently and therefore remain fluid for long periods of time. To form the viscoelastic silicone rubbers, those two groups are combined so that the curing reaction can commence, either at room temperature for RTV formulations or at elevated temperature for HTV formulations.

Foamed rubber compositions using the VSR compositions of the invention may also be prepared using techniques known in the art. For example a foaming agent may be added to the mixture prior to placing it in a mold or at least prior to curing the mixture. Alternatively, a pressurized gas such as nitrogen may be injected into the mixture during the curing step. Foamed rubber compositions may also be achieved by gas evolution as a by-product of the curing process. Each of these methods, which are known in the art, is described in the examples below.

Uses and Applications of Viscoelastic Siloxane Rubber Compositions

The VSR compositions of the invention may be used in the same way and applications as other viscoelastic rubber compositions such as bouncing putty, viscoelastic urethane foams, and other known viscoelastic compositions and high-resilience compositions. Common among the applications and uses of bouncing putty and other such compositions are time delays, motion rate governors, shock absorbing devices, motion coupling devices, furniture leveling devices, adaptive padding, and therapy putties. For a number of these uses, however, the bouncing putty requires containment to keep the putty from flowing beyond its intended region—something that the VSR compositions of the invention do not require. More specific uses and applications include, but are not limited to, acoustic coupling devices; arch supports for shoes; body armor; cargo restrains; cleaning rollers and pads; doorstops; earplugs; exercise devices; furniture leveling devices; grips for tree shakers; grips for writing implements; heel stabilizers for shoes; impact force dispersion devices and equipment; insoles for shoe; mattresses; momentum dispersion devices and equipment; motion and intrusion sensors; motion rate governors; orthotics, pads, separators, and other non-rigid structures for human health and comfort; padding and support for flooring materials; padding for bicycle seats; padding for boots; padding for cameras; padding for crutches; padding for earpieces; padding for firearms; padding for hearing aids; padding for shoulder straps; padding for sports equipment; prostheses; physical therapy materials; safety cushions and pads; seals for sound, heat, and chemicals; shock dispersion devices and equipment; straps and cords; time delay devices; toys; vibration, rattling, chattering, buzzing, and motion snubbers; vibration transducers; and wedges and other retaining devices.

The VSR compounds of the invention have a tacky surface. This allows the rubber composition to adhere to another material such as cloth. The tacky surface of the compounds may also be passivated by coating the surface with a solution containing a further amount of a siloxane bond-forming crosslinking agent, such as TEOS, and a catalyst. The solution may also contain additional silanol-terminated polyorganosiloxanes. Passivating the surface layer removes its tackiness.

EXAMPLES

The materials used in the examples below are listed in Table 3. In the examples below an expression such as "XXX at nn % saturation" or "nn % XXX," where XXX is a compound that can react with silanol groups, refers to the amount of XXX added to a particular silicone blend that is sufficient to bind with nn % of the silanol groups in that silicone blend. Similarly, the expression "YYY at nn wt %" or "nn wt % YYY," where YYY is a compound or material that can be added to a silicone blend, refers to the amount of YYY added to a particular silicone blend that is nn % of the

TABLE 3

| | |
|---|---|
| PDMS | trimethyl-terminated polydimethylsiloxane fluid |
| STPOS | silanol-terminated polyorganosiloxanes |
| STPDMS | silanol-terminated polydimethylsiloxane fluid |
| 16-32 cSt STPDMS | STPDMS having a viscosity of 16-32 cSt (Gelest DMS-S12) |
| 45-85 cSt STPDMS | STPDMS having a viscosity of 45-85 cSt (Gelest DMS-S15) |
| 90-120 cSt STPDMS | STPDMS having a viscosity of 90-120 cSt (Gelest DMS-S21) |
| 700-800 cSt STPDMS | STPDMS having a viscosity of 700-800 cSt (Gelest DMS-S27) |
| 3500 cSt STPDMS | STPDMS having a viscosity of 3500 cSt (Gelest DMS-S33) |
| BA | boric acid, $B(OH)_3$ |
| TMB | trimethyl borate, $B(OCH_3)_3$ |
| TIP | titanium(IV) isopropoxide (Alfa/Aesar) |
| PDEOS | polydiethoxysilane (Gelest PSI-021) |
| TEOS | tetraethoxysilane (Gelest SIT7110.0) |
| MTEOS | methyltriethoxysilane (Alfa/Aesar) |
| VTAS | vinyltriacetoxysilane (Gelest SIV9098.0) |
| VTEOS | Vinyltriethoxysilane (Alfa/Aesar) |
| IP | Isopropanol |
| TFS | hexamethyldisilazane-treated fume silica (Gelest SIS6962.0 of Cab-o-Sil TS-530) |
| TO | tin II octoate (Gelest SNB1100) |
| AMA | AeroMarine Rapid Set Silicone Cure Accelerator (AeroMarine Products, San Diego, CA). |
| PMHS | polymethylhydrosiloxane (Gelest HMS-991) |
| PMHS-PDMS copolymer | Polymethylhydrosiloxane-PDMS copolymer (Gelest HMS-301) |
| DCP | dicumyl peroxide (Gelest SID3379.0) |
| VX | 2,5-bis(tert-butylperoxy)-2,5-dimethylhexane (Luperox® 101) |
| G1958 | Garamite 1958 (Southern Clay Products) |
| ISAlc | Iso-Stearic Alcohol, a highly branched isomer of stearyl alcohol (Nissan Chemical FO-180) |
| ISA | Iso-Stearic Acid, a highly branched isomer of stearic acid (Nissan Chemical Iso-Stearic Acid) |
| ISAN | Iso-Stearic Acid-N, a branched isomer of stearic acid (Nissan Chemical Iso-Stearic Acid) |
| Pt | 3-3.5% Platinum-divinyltetramethyldisiloxane complex, Karstedt catalyst (Gelest SIP6830.3) |
| TVTMTS | 1,3,5,7-tetravinyl-1,3,5,7-tetramethylcyclotetrasiloxane moderator (Gelest SID4613.0) |
| Struksilon 8018 | silicone-polyether surfactant (Schill+Seilacher Struksilon 8018) |

Example 1 Oleic-Acid-Softened Condensation-Cure VSR Based on 40% TEOS and 65% TMB in 30 wt % TFS Reinforced 90-120 cSt STPDMS 30 wt % TFS was dispersed in 90-120 cSt STPDMS using a 3-roll mill. To 40.0 g of this blend, 0.330 g TMB (65% saturation), 0.667 g AMA (2 wt %), and 0.331 g TEOS (40% saturation) were added. The mixture was degassed in vacuum, placed in a sheet mold that measured 3"×3"×0.1875", and allowed to cure and dry for a week at 63° C. in a dehydrator.

The cured sample was immersed in oleic acid for several days. When removed and blotted dry, the sample sheet was highly viscoelastic and very soft. It deformed easily when touched or squeezed, but recovered completely over a period of seconds. Its Shore Hardness was determined to be 65O at t=0, 20O at t=5 sec, and 12O at t=60 sec.

Example 2 Oleic-Acid-Softened Condensation-Cure VSR Based on 50% TEOS and 60% TMB in 12.5 wt % G1958-Reinforced 90-120 cSt STPDMS 12.5 wt % G1958 was dispersed in 90-120 cSt STPDMS using an immersion blender. This blend was then heat-treated as a thin layer on an aluminum surface for 5 minutes at 180° C. The resulting blend was extremely viscous and thixotropic.

To 40.0 g of this blend, 0.352 g TMB (60% saturation), 0.711 g AMA (2 wt %), and 0.441 g TEOS (50% saturation) were added. The mixture was degassed in vacuum, placed in a sheet mold that measured 3"×3"×0.1875", and allowed to cure and dry for a week at 63° C. in a dehydrator.

The fully cured sample was immersed in oleic acid for several days. When removed and blotted dry, the sample sheet was highly viscoelastic and very soft. It deformed easily when touched or squeezed, but recovered almost completely over a period of seconds. Its Shore Hardness was determined to be 35A, 54O at t=0, 3A, 19O at t=5 sec, and 0A, 9O at t=60 sec.

Example 3 ISAlc-Softened Condensation-Cure VSR Based on 60% MTEOS and 50% TMB in 15 wt % TFS-Reinforced 90-120 cSt STPDMS 15 wt % TFS was dispersed in 90-120 cSt STPDMS using a 3-roll mill. To 40.0 g of this blend, 0.800 g ISAlc (2 wt %), 0.289 g TMB (50% saturation), 0.700 g AMA (2 wt %), and 0.594 g MTEOS (60% saturation) were added. The mixture was degassed in vacuum, placed in a sheet mold measuring 3"×3"×0.1875", and allowed to cure for 24 hours at 40° C. in a dehydrator.

The resulting sheet was highly viscoelastic and medium soft. Its Shore Hardness was determined to be 22A, 35O at t=0, 12A, 26O at t=5 sec, and 7A, 21O at t=60 sec. It deformed fairly easily when touched or squeezed, but recovered completely over a period of seconds. A steel ball dropped on its surface rebounded almost to its original height.

Example 4 ISAN-Softened Condensation-Cure VSR Based on 60% MTEOS and 50% TMB in 15 wt % TFS-Reinforced 90-120 cSt STPDMS 15 wt % TFS was dispersed in 90-120 cSt STPDMS, using a 3-roll mill. To 40.0 g of this blend, 0.400 g ISAN (1 wt %), 0.289 g TMB (50% saturation), 0.350 g AMA (1 wt %), and 0.594 g MTEOS (60% saturation) were added. The mixture was degassed, placed in a sheet mold measuring 3"×3"×0.1875", and allowed to cure for 24 hours at 40° C. in a dehydrator.

The resulting sheet was highly viscoelastic and very soft. Its Shore Hardness was determined to be 38A, 55O at t=0, 20A, 36O at t=5 sec, and 13A, 29O at t=60 sec. It deformed easily when touched or squeezed, but recovered completely over a period of seconds. A steel ball dropped on its surface rebounded almost to its original height.

Example 5 ISAN-Softened Condensation-Cure VSR Based on 70% MTEOS and 40% TMB in 20 wt % TFS-Reinforced 700-800 cSt STPDMS 20 wt % TFS was dispersed in 700-800 cSt STPDMS using a 3-roll mill. To 40.0 g of this blend, 0.400 g ISAN (1 wt %), 0.051 g TMB (40% saturation), 0.350 g AMA (1 wt %), and 0.154 g MTEOS (70% saturation) were added. The mixture was degassed in vacuum, placed in a sheet mold measuring 3"×3"×0.1875", and allowed to cure for 24 hours at 40° C. in a dehydrator.

The resulting sheet was highly viscoelastic and extremely soft. Its Shore Hardness was determined to be 22A, 38O at t=0, 12A, 26O at t=5 sec, and 7A, 20O at t=60 sec. It deformed easily when touched or squeezed, but recovered completely over a period of seconds. A steel ball dropped on its surface rebounded to a fraction of its original height.

Example 6 ISAN-Softened Condensation-Cure VSR Based on 70% MTEOS and 40% TMB in 20 wt % TFS-Reinforced 3500 cSt STPDMS 20 wt % TFS was dispersed in 3500 cSt STPDMS using a 3-roll mill. To 40.0 g of this blend, 0.400 g ISAN (1 wt %), 0.021 g TMB (40% saturation), 0.350 g AMA (1 wt %), and 0.064 g MTEOS (70% saturation) were added. The mixture was degassed in vacuum, placed in a sheet mold measuring 3"×3"×0.1875", and allowed to cure for 24 hours at 40° C. in a dehydrator.

The resulting sheet was highly viscoelastic and extremely soft. Its Shore Hardness was determined to be 20O at t=0, 11O at t=5 sec, and 4O at t=60 sec. It deformed easily when touched or squeezed, but recovered completely over a period of seconds. A steel ball dropped on its surface rebounded to a small fraction of its original height.

Example 7 Peroxide-Cure VSR Based on 50% HTV Silicone and 50% (ISAN-Softened 16-32 cSt STPDMS-Based Borosilicone), Blended and Crosslinked Using VX ISAN-softened 16-32 cSt STPDMS-based 100%-saturated borosilicone (Borosilicone A) was made by adding 12.788 g TMB (100% saturation) and 0.254 g ISAN (0.25 wt %) to 101.441 g 16-32 cSt STPDMS. The mixture was heated to 150° C. for 3 hours in a convection oven to evaporate the resulting methanol and further dried as a thin sheet at 63° C. in a dehydrator overnight.

16.0 g of the softened borosilicone was combined with 16.0 g of Wacker R401/50 HTV silicone and kneaded together until the mixture was homogeneous. 0.080 g of VX crosslinker was added and the mixture was kneaded again until homogeneous. The viscous blend was squeezed into a Teflon sheet mold, 3"×3"×0.1875" deep. The mold was capped with a Teflon sheet and was placed in an aluminum press. The aluminum press was bolted closed with the help of a 20 ton hydraulic press. The press and mold assembly were heated to 165° C. for 30 minutes. After cooling the mold to room temperature, the finished VSR sample was removed.

This VSR had a Shore Hardness of 52A, 60O at t=0, 11A, 31O at t=5 sec, and 4A, 12O at t=60 sec. It could be stretched slowly to more than 4 times its original width and returned gradually to its original shape.

Example 8 Peroxide-Cure VSR Based on 60% HTV Silicone and 40% (ISAN Softened 16-32 cSt STPDMS-Based Borosilicone), Blended and Crosslinked Using VX 12.8 g of Borosilicone A was combined with 19.2 g of Wacker R401/50 HTV silicone and kneaded together until the mixture was homogeneous. 0.096 g of VX crosslinker was added and the mixture was kneaded again until homogeneous. The viscous blend was squeezed into a Teflon sheet mold, 3"×3"×0.1875" deep. The mold was capped with a Teflon sheet and placed in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 60A, 70O at t=0, 17A, 42O at t=5 sec, and 6A, 26O at t=60 sec. It could be stretched slowly to more than 4 times its original width and returned gradually to its original shape.

Example 9 Peroxide-Cure VSR Based on 50% HTV Silicone and 50% (Highly-ISAN-Softened 16-32 cSt STPDMS-Based Borosilicone), Blended and Crosslinked Using VX 16.0 g of Borosilicone A was combined with an additional 0.280 g of ISAN, and then with 16.0 g of Wacker R401/50 HTV silicone. The mixture was kneaded together until it was homogeneous. 0.080 g of VX crosslinker was added and the mixture was kneaded again until homogeneous. The viscous blend was squeezed into a Teflon sheet mold, 3"×3"×0.1875" deep, and the mold was capped with a Teflon sheet and placed in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 40A, 52O at t=0, 5A, 22O at t=5 sec, and 4A, 11O at t=60 sec. It could be stretched fairly quickly to more than 4 times its original width and returned gradually to approximately its original shape.

Example 10 Peroxide-Cure VSR Based on 50% HTV Silicone and 50% (ISAN-Softened 90-120 cSt STPDMS-Based Borosilicone), Blended and Crosslinked Using VX ISAN-softened 90-120 cSt STPDMS-based 100%-saturated borosilicone (Borosilicone B) was made by adding 1.723 g TMB (100% saturation) and 0.261 g ISAN (0.25 wt %) to 104.4 g 90-120 cSt STPDMS. The mixture was heated to 150° C. for 3 hours in a convection oven to evaporate the resulting methanol and further dried as a thin sheet at 63° C. in a dehydrator overnight.

16.0 g of the softened borosilicone was combined with 16.0 g of Wacker R401/50 HTV silicone and kneaded together until the mixture was homogeneous. 0.080 g of VX crosslinker was added and the mixture was kneaded again until homogeneous. The viscous blend was squeezed into a Teflon sheet mold, 3"×3"×0.1875" deep. The mold was capped with a Teflon sheet and placed in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 44O at t=0, 22O at t=5 sec, and 6O at t=60 sec. It could be stretched slowly to more than 4 times its original width and returned gradually to its original shape.

Example 11 Peroxide-Cure VSR Based on 60% HTV Silicone and 40% (ISAN-Softened 90-120 cSt STPDMS-Based Borosilicone), Blended and Crosslinked Using VX 12.8 g of Borosilicone B was combined with 19.2 g of Wacker R401/50 HTV silicone and kneaded together until the mixture was homogeneous. 0.080 g of VX crosslinker was added and the mixture was kneaded again until homogeneous. The viscous blend was squeezed into a Teflon sheet mold, 3"×3"×0.1875" deep. The mold was capped with a Teflon sheet and placed in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 27A, 45O at t=0, 11A, 31O at t=5 sec, and 4A, 17O at t=60 sec. It could be stretched slowly to more than 4 times its original width and returned gradually to its original shape.

Example 12 Addition-Cure VSR Based on 50% HTV Silicone and 50% (ISAN-Softened 90-120 cSt STPDMS-Based Borosilicone), Blended and Crosslinked Using PMHS-PDMS and Pt A moderated platinum solution (Platinum A) was prepared by dispersing 1 wt % Pt and 2 wt % TVTMTS in 10 cSt PDMS.

4.0 g of Borosilicone A was combined with 4.0 g of Wacker R401/50 HTV silicone and kneaded together until the mixture was homogeneous. 0.080 g of PMHS-PDMS (200% saturation) and 0.160 g of Platinum A were added. The mixture was kneaded again until homogeneous, then squeezed into a 1"×1"×0.5" Delrin mold. An acetate lid was pressed onto the mold. It set overnight and was fully cured after a week. This VSR had a Shore Hardness of 63A, 73O at t=0, 60A, 67O at t=5 sec, and 39A, 57O at t=60 sec.

Example 13 Addition-Cure VSR Based on 50% HTV Silicone and 50% (ISAN-Softened 90-120 cSt STPDMS-Based Borosilicone), Blended and Crosslinked Using PMHS-PDMS and Pt A moderated platinum solution (Platinum B) was prepared by dispersing 1 wt % Pt and 3 wt % TVTMTS in toluene.

4.0 g of Borosilicone A was combined with 4.0 g of Wacker R401/50 HTV silicone and kneaded together until the mixture was homogeneous. 0.025 g of PMHS-PDMS (<100% saturation) and 0.100 g of Platinum B were added. The mixture was kneaded again until homogeneous, and a 20 ton press was used to squeeze the mixture into a 1.5" diameter×0.1875" aluminum mold with a Teflon gasket. The mixture was then cured at 165° C. for 30 minutes. This VSR had a Shore Hardness of 48A, 58O at t=0, 10A, 27O at t=5 sec, and 2A, 13O at t=60 sec.

Example 14 Peroxide-Cure VSR Based on 50% HTV Silicone and 50% (90-120 cSt STPDMS-Based 200%-Saturated Titanosilicone), Blended and Crosslinked Using VX 90-120 cSt STPDMS-based 100%-Saturated titanosilicone was prepared by adding 3.384 g TIP (200% saturation) to 50.0 g 90-120 cSt STPDMS. The mixture was heated to 175° C. for 4 hours in a convection oven to evaporate the volatile reaction products. The mixture was further dried as a thin sheet at 63° C. in a dehydrator overnight.

16.0 g of the titanosilicone was combined with 16.0 g of Wacker R401/50 HTV silicone and kneaded together until the mixture was homogeneous. 0.080 g of VX crosslinker was added, and the mixture was kneaded again until homogeneous. The sticky, viscous blend was squeezed into a Teflon sheet mold, 3"×3"×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 18A, 43O at t=0, 4A, 24O at t=5 sec, and 0A, 10O at t=60 sec. It was stickier than borosilicone-based VSRs.

Example 15 Peroxide-Cure VSR Based on 50% HTV Silicone and 50% (ISAN-Softened 90-120 cSt STPDMS-Based Borotitanosilicone), Blended and Crosslinked Using VX ISAN softened 90-120 cSt STPDMS-based 100%-Saturated borotitanosilicone was made by adding 0.550 g TMB (67% saturation), 0.558 g TIP (33% saturation), and 0.125 g ISAN (0.25 wt %) to 50.0 g 90-120 cSt STPDMS. The mixture was heated to 175° C. for 4 hours in a convection oven to evaporate the volatile reaction products and further dried as a thin sheet at 63° C. in a dehydrator overnight.

To 16.0 g of the borotitanosilicone, 0.050 g TMB (25% saturation) was added, and the mixture was allowed to dry in the dehydrator at 63° C. for several hours. The mixture was then combined with 16.0 g of Wacker R401/50 HTV silicone and kneaded together until the mixture was homogeneous. 0.080 g of VX crosslinker was added and the mixture was kneaded again until homogeneous. The sticky, viscous blend was squeezed into a Teflon sheet mold, 3"×3"×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 14A, 40O at t=0, 3A, 16O at t=5 sec, and 0A, 6O at t=60 sec. It was much stickier than borosilicone-based VSRs.

Example 16 Peroxide-Cure VSR Based on 50% HTV Silicone and 50% (ISAN-Softened 700-800 cSt STPDMS-Based Borosilicone), Blended and Crosslinked Using VX ISAN softened 700-800 cSt STPDMS-based 100%-Saturated borosilicone was made by adding 0.385 g TMB (100% saturation) and 0.250 g ISAN (0.25 wt %) to 100.0 g 700-800 cSt STPDMS. The mixture was heated to 175° C. for 4 hours in a convection oven to evaporate the resulting methanol and further dried as a thin sheet at 63° C. in a dehydrator overnight.

16.0 g of the softened borosilicone was combined with 16.0 g of Wacker R401/60 HTV silicone and kneaded together until the mixture was homogeneous. 0.080 g of VX crosslinker was added and the mixture was kneaded again until homogeneous. The viscous blend was squeezed into a Teflon sheet mold, 3"×3"×0.1875" deep. The mold was capped with a Teflon sheet and placed in an aluminum press, which was bolted closed with the help of a 20 ton hydraulic press. The press and mold assembly were heated to 165° C. for 30 minutes. After cooling the mold to room temperature, the finished VSR sample was removed. This VSR had a Shore Hardness of 22A, 43O at t=0, 5A, 24O at t=5 sec, and 2A, 13O at t=60 sec.

Example 17 Peroxide-Cure VSR Based on a VPCB (50% TMB and 0.25 wt % ISAN in 50% VTAS-Crosslinked 90-120 cSt STPDMS), Blended and Crosslinked Using VX A partially crosslinked silicone fluid was made by adding 1.843 g VTAS (50% saturation) and 0.100 g AMA (0.1 wt %) to 100.0 g 90-120 cSt STPDMS. The mixture was stirred vigorous in an open beaker and allowed to cure for 72 hours, at which time the viscosity of the partially crosslinked silicone fluid had reached approximately 600 cSt. To this silicone fluid, 0.250 g ISAN (0.25 wt %) and 0.825 g TMB (50% saturation) were added. The resulting softened VPCB (vulcanizable partially crosslinked borosilicone) was allowed to dry at room temperature as a thin sheet for 48 hours.

To 8.0 g of the VPCB, 0.046 g VX crosslinker was added, and the mixture was kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This unreinforced VSR had a Shore Hardness of 45O at t=0, 19O at t=5 sec, and 8O at t=60 sec.

Example 18 Peroxide-Cure VSR Based on a VPCB (60% TMB and 0.25 wt % ISAN in 50% VTEOS-Crosslinked 90-120 cSt STPDMS), Blended and Crosslinked Using VX A partially crosslinked silicone fluid was made by adding 1.510 g VTEOS (50% saturation) and 0.250 g AMA (0.25 wt %) to 100.0 g 90-120 cSt STPDMS. The mixture was allowed to cure in an open beaker for 6 days, at which time the partially crosslinked silicone fluid began to gel slightly. To this silicone fluid, 0.250 g ISAN (0.25 wt %) and 0.990 g TMB (60% saturation) were added. The resulting softened but slightly gelled VPCB was allowed to dry at room temperature as a thin sheet for 1 hour.

To 8.0 g of the VPCB, 0.052 g VX crosslinker was added, and the mixture was kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This unreinforced VSR had a Shore Hardness of 30O at t=0, 15O at t=5 sec, and 12O at t=60 sec.

Example 19 Peroxide-Cure VSR Based on a VPCB (12.5 wt % G1958 Reinforcement and 60% TMB in 50% VTAS-Crosslinked 90-120 cSt STPDMS), Blended and Crosslinked Using VX A partially crosslinked silicone fluid was made by adding 0.718 g AMA (0.1 wt %) and 13.230 g VTAS (50% saturation) to 717.7 g 90-120 cSt STPDMS. The mixture was stirred vigorous in an open beaker and allowed to cure for 2 hours, at which time the viscosity of the partially crosslinked silicone fluid had reached approximately 250 cSt. To 10 g of this silicone fluid, 1.250 g G1958 (12.5 wt %) was added and the blend was heat-treated as a thin layer on a 165° C. surface for 5 minutes.

To 8 g of this heat-treated blend, 0.078 g TMB (50% saturation) was added and the resulting VPCB was kneaded until homogeneous and relatively dry. 0.050 g VX crosslinker was added and the mixture was again kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This G1958-reinforced VSR had a Shore Hardness of 55A, 68O at t=0, 36A, 58O at t=5 sec, and 17A, 34O at t=60 sec.

Example 20 Peroxide-Cure VSR Based on a VPCB (10 wt % TFS Reinforcement and 60% TMB in 50% VTAS Crosslinked 90-120 cSt STPDMS), Blended and Crosslinked Using VX A partially crosslinked silicone fluid was made by adding 0.718 g AMA (0.1 wt %) and 13.230 g VTAS (50% saturation) to 717.7 g 90-120 cSt STPDMS. The mixture was stirred vigorous in an open beaker and allowed to cure for 24 hours, at which time the viscosity of the partially crosslinked silicone fluid had reached approximately 350 cSt. To 425.1 g of this silicone fluid, 41.3 g Cabot TS-530 TFS (10 wt %) was added and dispersed using a 3-roll mill.

To 416.2 g of this TFS-reinforced partially crosslinked silicone fluid, 1.040 g ISAN (0.25 wt %) and 3.748 g TMB (60% saturation) were added and the resulting VPCB (VPCB A) was kneaded until homogeneous and then allowed to dry at room temperature as a thin sheet for 24 hours.

To 8.0 g of this VPCB, 0.010 g TMB and 0.040 g VX crosslinker were added and the mixture was kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This TFS-reinforced VSR had a Shore Hardness of 40O at t=0, 17O at t=5 sec, and 8O at t=60 sec.

Example 21 Peroxide-Cure VSR Based on 50% HTV Silicone and 50% VPCB (10 wt % TFS Reinforcement and 60% TMB in 50% VTAS Crosslinked 90-120 cSt STPDMS), Blended and Crosslinked Using VX 4.0 g of VPCB A and 4.0 g of Wacker R401/60 HTV silicone were combined and kneaded together until the mixture was homogeneous. To that mixture, 0.040 g VX crosslinker was added and the mixture was again kneaded until homogeneous. The mixture was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This VSR had a Shore Hardness of 40A, 60O at t=0, 28A, 46O at t=5 sec, and 21A, 37O at t=60 sec.

Example 22 Peroxide-Cure VSR Based on 25% HTV Silicone and 75% VPCB (10 wt % TFS Reinforcement and 60% TMB in 50% VTAS Crosslinked 90-120 cSt STPDMS), Blended and Crosslinked Using VX 6.0 g of VPCB A and 2.0 g of Wacker R401/60 HTV silicone were combined and kneaded together until the mixture was homogeneous. To that mixture, 0.040 g VX crosslinker was added and the mixture was again kneaded until homogeneous. The mixture was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This VSR had a Shore Hardness of 38A, 52O at t=0, 18A, 32O at t=5 sec, and 11A, 23O at t=60 sec.

Example 23 Peroxide-Cure VSR Based on a VPCB (15 wt % TFS Reinforcement and 60% TMB in 50% VTAS-Crosslinked 90-120 cSt STPDMS), Blended and Crosslinked Using VX A partially crosslinked silicone fluid was made by adding 0.783 g AMA (0.1 wt %) and 14.432 g VTAS (50% saturation) to 782.9 g 90-120 cSt STPDMS. The mixture was stirred vigorous in an open beaker and allowed to cure for 52 hours, at which time the viscosity of the partially crosslinked silicone fluid had reached approximately 1500 cSt. To 774.4 g of this silicone fluid, 116.1 g Cabot TS-530 TFS (15 wt %) was added and dispersed using a 3-roll mill.

To 847.6 g of this TFS-reinforced silicone fluid, 2.119 g ISAN (0.25 wt %) and 7.300 g TMB (60% saturation) were added and the resulting VPCB (VPCB B) was kneaded until homogeneous and then allowed to dry at room temperature as a thin sheet for 24 hours.

To 8.0 g of this VPCB, 0.042 g VX crosslinker was added and the mixture was kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This TFS-reinforced VSR had a Shore Hardness of 38A, 48O at t=0, 15A, 27O at t=5 sec, and 9A, 20O at t=60 sec.

Example 24 Peroxide-Cure VSR Based on a Vulcanizable Partially Crosslinked Titanosilicone (60% TIP and 0.25 wt % ISAN in 50% VTEOS-Crosslinked 90-120 cSt STPDMS), Blended and Crosslinked Using VX A partially crosslinked silicone fluid was made by adding 1.843 g VTAS (50% saturation) and 0.100 g AMA (0.1 wt %) to 100.0 g 90-120 cSt STPDMS. The mixture was stirred vigorously in an open beaker and allowed to cure for 7 days, at which time the viscosity of the partially crosslinked silicone fluid had reached approximately 500 cSt.

To 8.3 g of this silicone fluid, 0.200 g TIP (70% saturation) and 0.020 g ISAN (0.25 wt %) were added. The resulting softened vulcanizable partially crosslinked titanosilicone (VPCT) was kneaded until homogeneous and relatively dry.

To 8.0 g of the VPCT, 0.046 g VX crosslinker was added, and the mixture was kneaded until homogeneous. The blend was squeezed into a Teflon disk mold, 1.5" dia×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed. This unreinforced VSR had a Shore Hardness of 25O at t=0, 19O at t=5 sec, and 16O at t=60 sec.

Example 25 Peroxide-Cure Foamed VSR Based on 3 wt % Expancels in a VPCB (15 wt % TFS Reinforcement and 60% TMB in 50% VTAS-Crosslinked 90-120 cSt STPDMS), Blended and Crosslinked Using VX 0.120 g Expancels (930 DU 120) and 0.020 g VX crosslinker were added to 4.0 g of VPCB B. The mixture was kneaded until homogeneous. The blend was squeezed into a Teflon disk mold, 1.5" dia×0.1875" deep, and the mold was capped with a Teflon sheet and placed it in an aluminum press, which was bolted closed. The press and mold assembly were heated to 165° C. for 30 minutes. After cooling the mold to room temperature, the finished foamed VSR sample was removed. The density of this foamed TFS-reinforced VSR was approximately half that of Example 23 and it had a Shore Hardness of 48O at t=0, 28O at t=5 sec, and 21O at t=60 sec.

Example 26 Addition-Cure VSR Based on a VPCB (100% TMB in 90% VTAS-Crosslinked 700-800 cSt STPDMS), Blended and Crosslinked with PMHSPDMS and Pt A partially crosslinked silicone fluid was made by adding 0.774 g VTAS (90% saturation) dropwise to 100.0 g 700-800 cSt STPDMS, while stirring vigorously. The mixture was allowed to cure, without catalyst, for 5 hours and it became extremely viscous.

To 3.2 g of this partially crosslinked silicone fluid, 0.012 g TMB (100% saturation), 0.030 g of PMHS-PDMS, and 0.005 g of platinum complex solution (Gelest SIP6830.3) were added. The mixture was kneaded until homogeneous. It was formed into a block and allowed to cure overnight at room temperature. It became a VSR as the result of the addition cure.

Example 27 Peroxide-Cure VSR Based on a VPCB (15 wt % TFS-Reinforcement and 75% TMB in 40% VTAS-Crosslinked 90-120 cSt STPDMS), Blended and Crosslinked Using VX A partially crosslinked silicone fluid was made by adding 10.009 g VTAS (40% saturation) to 678.7 g 90-120 cSt STPDMS. Prior to this addition, the STPDMS was carefully dried and degassed by stirring it vigorously in vacuum for 40 minutes. The fluid bubbled rapidly as moisture and other volatiles boiled out of it, but after 40 minutes it stopped bubbling. The VTAS was added to the dried STPDMS fluid in a nitrogen-filled glove box and the mixture was returned to vacuum. It was stirred rapidly under vacuum for 5 minutes, when it again stopped bubbling. The mixture was sealed under an aluminum foil lid and warmed to 60° C. for 18 hours. It was then uncovered and allowed to continue curing at room temperature for 24 hours. At that time, the fluid's viscosity had increased to approximately 8,200 cSt, almost 100 times its starting value.

To this partially crosslinked STPDMS, 15 wt % TFS was added and dispersed using a 3-roll mill. To 672.2 g of this reinforced mixture, 0.292 g of ISAN (0.05 wt %) and 7.237 g of TMB (75% saturation) were added. The resulting VPCB (VPCB C) was stirred until homogeneous and then spread out to dry at room temperature as a thin layer on a polyethylene plate.

To 8.0 g of this VPCB were added 0.080 g VX (1.0 wt %). The mixture was kneaded to homogeneity, pressed into a Teflon mold with a Teflon lid, and baked at 165° C. for 30 minutes. This TFS-reinforced VSR had a Shore Hardness of 40A, 53 at t=0, 24A, 41O at t=5 sec, and 17A, 26O at t=60 sec.

Example 28 Peroxide-Cure VSR Based on a VPCB (15 wt % TFS Reinforcement and 150% TMB in 90% VTAS-Crosslinked 700-800 cSt STPDMS), Blended and Crosslinked Using VX A partially crosslinked silicone fluid was made by adding 5.239 g VTAS (90% saturation) to 676.7 g 700-800 cSt STPDMS. Prior to this addition, the STPDMS was carefully dried and degassed by stirring it vigorously in vacuum for 90 minutes. The fluid bubbled rapidly as moisture and other volatiles boiled out of it, but after 90 minutes it stopped bubbling. The VTAS was added to the dried STPDMS fluid in a nitrogen-filled glove box and the mixture was returned to vacuum. It was stirred rapidly under vacuum for 5 minutes, when it again stopped bubbling. The mixture was sealed under an aluminum foil lid and warmed to 60° C. for 18 hours. It was then uncovered and allowed to continue curing at room temperature for 24 hours. At that time, the fluid's viscosity had increased to approximately 33,000 cSt, almost 50 times its starting value.

To this partially crosslinked STPDMS, 15 wt % TFS was added and dispersed using a 3-roll mill. To 713.8 g of this reinforced mixture, 0.310 g of ISAN (0.05 wt %) and 3.586 g of TMB (150% saturation) were added. The resulting VPCB (VPCB D) was stirred until homogeneous, then spread out to dry at room temperature as a thin layer on a polyethylene plate.

To 8.0 g of this VPCB were added 0.040 g VX (0.5 wt %). The mixture was kneaded to homogeneity, pressed into a Teflon mold with a Teflon lid, and baked at 165° C. for 30 minutes. This TFS-reinforced SR had a Shore Hardness of 28A, 46O at t=0, 19A, 35O at t=5 sec, and 13A, 27O at t=60 sec.

Example 29 Addition-Cure VSR Based on 50% VPCB (15 wt % TFS Reinforcement and 75% TMB in 40% VTAS-Crosslinked 90-120 cSt STPDMS), 25% HTV Silicone, and 25% Borosilicone (100% BA in 90-120 cSt STPDMS), Blended and Crosslinked Using PMHS-PDMS and Pt A moderated platinum solution (Platinum C) was prepared by dispersing 5 wt % Pt and 10 wt % TVTMTS in 350 cSt STPDMS.

6.0 g of VPCB C were combined with 3.0 g of HTV silicone (Wacker R401/50), 3.0 g borosilicone (100% BA in 90-120 cSt STPDMS), and 0.010 g acetic acid. The resulting 50/25/25 blend was kneaded until homogeneous and then 0.100 g PMHS-PDMS (approximately 100% saturation) and 0.050 g of Platinum C were added. The mixture was kneaded until homogeneous and then pressed into an aluminum mold with a Teflon lid. It was heated to 110° C. for 30 minutes and underwent the addition cure. This TFS-reinforced VSR had a Shore Hardness of 27A, 46O at t=0, 11A, 25O at t=5 sec, and 1A, 10O at t=60 sec.

Example 30 Addition-Cure VSR Based on 50% VPCB (15 wt % TFS Reinforcement and 150% TMB in 90% VTAS-Crosslinked 700-800 cSt STPDMS), 25% HTV Silicone, and 25% Borosilicone (100% BA in 90-120 cSt STPDMS), Blended and Crosslinked PMHS-PDMS and Pt 6.0 g of VPCB D were combined with 3.0 g of HTV silicone (Wacker R401/50), 3.0 g borosilicone (100% BA in 90-120 cSt STPDMS), and 0.010 g acetic acid. The resulting 50/25/25 blend was kneaded until homogeneous and then 0.100 g PMHS-PDMS (approximately 100% saturation) and 0.050 g of Platinum C were added. The mixture was kneaded until homogeneous and then pressed into an aluminum mold with a Teflon lid. It was heated to 110° C. for 30 minutes and underwent the addition cure. This TFS-reinforced VSR had a Shore Hardness of 23A, 40O at t=0, 11A, 26O at t=5 sec, and 2A, 11O at t=60 sec.

Example 31 Addition-Cure Foamed VSR Based on 50% VPCB (15 wt % TFS Reinforcement and 150% TMB in 90% VTAS-Crosslinked 700-800 cSt STPDMS), 25% HTV Silicone, and 25% Borosilicone (100% TMB in 90-120 cSt STPDMS), Blended and Crosslinked Using PMHS-PDMS, Water, and Pt 5.5 g of VPCB D were combined with 2.75 g of HTV silicone (Wacker R401/50), 2.75 g borosilicone (100% TMB in 90-120 cSt STPDMS), and 0.010 g acetic acid. The resulting 50/25/25 blend was dried as a thin sheet at 60° C. for 24 hours, then softened with another 0.015 g acetic acid. To this mixture were added 0.020 g BA, 0.018 g of water, 0.345 g of PM HS-PDMS, and 0.035 g of Platinum C. The overall mixture was kneaded until homogeneous.

5.0 g of this mixture was pressed into an aluminum mold having a volume of 10 cc and covered with a Teflon cap. The mold and mixture were heated to 110° C. for 30 minutes. The resulting foamed TFS-reinforced VSR had a density of approximately 0.75 g/cc (it did not completely fill the mold) and a Shore Hardness of 35O at t=0, 26O at t=5 sec, and 12O at t=60 sec.

Example 32 Two-Part Addition-Cure VSR Based on 50% VPCB (15 wt % TFS Reinforcement and 150% TMB in 90% VTAS-Crosslinked 700-800 cSt STPDMS), 25% HTV Silicone, and 25% Borosilicone (100% TMB in 90-120 cSt STPDMS), Blended Separately with PMHS-PDMS and Pt and Crosslinked when Combined 4.0 g of VPCB D were combined with 2.0 g of HTV silicone (Wacker R401/50), 2.0 g borosilicone (100% TMB in 90-120 cSt STPDMS), and 0.004 g acetic acid. To a 4.0 g portion of the resulting 50/25/25 blend were added 0.075 g PMHS-PDMS, thereby forming Part A. To a second 4.0 g portion of the 50/25/25 blend were added 0.020 g of Platinum C, thereby forming Part B. Each part was kneaded until homogeneous.

After 5 days, Part A and Part B remained unchanged. They were combined and kneaded together carefully. The combined mixture was pressed into a Teflon mold and heated to 110° C. for 30 minutes. The resulting TFS-reinforced VSR had a Shore Hardness of 43O at t=0, 30O at t=5 sec, and 15O at t=60 sec.

Example 33 Addition-Cure VSR Based on 50% VPCB (15 wt % TFS Reinforcement and 150% TMB in 90% VTAS-Crosslinked 700-800 cSt STPDMS), 25% HTV Silicone, and 25% Borosilicone (100% TMB in 90-120 cSt STPDMS), Blended, Softened with ISA, and Crosslinked Using PMHS-PDMS and Pt A partially crosslinked silicone fluid was made by adding 7.312 g VTAS (90% saturation) to 850.0 g 700-800 cSt STPDMS. Prior to this addition, the STPDMS was carefully dried and degassed by stirring it vigorously in vacuum for 30 minutes. The fluid bubbled rapidly as moisture and other volatiles boiled out of it, but after 30 minutes it stopped bubbling. The VTAS was added to the dried STPDMS fluid in a nitrogen-filled glove box and the mixture was returned to vacuum. It was stirred rapidly under vacuum for 15 minutes, when it again stopped bubbling. The mixture was sealed under an aluminum foil lid and warmed to 60° C. for 18 hours. It was then uncovered and allowed to cool to room temperature, where its viscosity was measured to be approximately 45,000 cSt, approximately 60 times its starting value.

To this partially crosslinked STPDMS, 15 wt % TFS was added and dispersed using a 3-roll mill. To 931.6 g of this reinforced mixture, 0.466 g of ISAN (0.05 wt %) and 4.681 g of TMB (150% saturation) were added. The resulting VPCB (VPCB E) was stirred until homogeneous, and then spread out to dry for 24 hours at room temperature as a thin layer on a polyethylene plate.

To 100.0 g of this VPCB were added 50.0 g of borosilicone (100% TMB in 90-120 cSt STPDMS) and 50.0 g of HTV silicone (Wacker R401/50). This resulting 50/25/25 blend (50/25/25 Blend A) was kneaded until homogeneous and then dried for 24 hours as a thin sheet at 60° C.

To 8.0 g of this 50/25/25 blend were added 0.008 g ISA (0.1 wt %) and the softened blend was kneaded until homogenous. Added then were 0.100 g PMHSPDMS, 0.025 g of Platinum C, and several mg of red pigment (Smooth-On Silc-Pig Red). The full combination was kneaded until homogeneous, pressed into a Teflon mold, and heated to 110° C. for 30 minutes. The resulting red VSR had a Shore Hardness of 42O at t=0, 24O at t=5 sec, and 15O at t=60 sec.

To a second 8.0 g portion of the 50/25/25 blend were added 0.016 g ISA (0.2 wt %) and the crosslinking procedure was repeated, but with green pigment (Smooth-On Silc-Pig Green). The resulting green VSR had a Shore Hardness of 37O at t=0, 17O at t=5 sec, and 9O at t=60 sec.

To a third 8.0 g portion of the 50/25/25 blend were added 0.024 g ISA (0.3 wt %) and the crosslinking procedure was repeated, but with red and blue pigment (Smooth-On Silc-Pig Red and Blue). The resulting violet VSR had a Shore Hardness of 32O at t=0, 13O at t=5 sec, and 5O at t=60 sec.

Example 34 Addition-Cure VSR Based on 50% VPCB (15 wt % TFS Reinforcement and 75% TMB in 40% VTAS-Crosslinked 90-120 cSt STPDMS), 25% HTV Silicone, and 25% Borosilicone (100% TMB in 90-120 cSt STPDMS), Blended, Softened with ISA, and Crosslinked Using PMHS-PDMS and Pt To 100.0 g of VPCB C were added 50.0 g of borosilicone (100% TMB in 90-120 cSt STPDMS) and 50.0 g of HTV silicone (Wacker R401/50). This 50/25/25 blend (50/25/25 Blend B) was kneaded until homogeneous and then dried for 24 hours as a thin sheet at 60° C.

To 8.0 g of this 50/25/25 blend were added 0.008 g ISA (0.1 wt %) and the softened blend was kneaded until homogenous. Added then were 0.100 g PMHSPDMS, 0.025 g of Platinum C, and several mg of blue pigment (Smooth-On Silc-Pig Blue). The full combination was kneaded until homogeneous, pressed into a Teflon mold, and heated to 110° C. for 30 minutes. The resulting blue VSR had a Shore Hardness of 44O at t=0, 24O at t=5 sec, and 15O at t=60 sec.

To a second 8.0 g portion of the 50/25/25 blend were added 0.016 g ISA (0.2 wt %) and the crosslinking procedure was repeated, but with orange pigment (Smooth-On Silc-Pig Fluorescent Orange). The resulting orange VSR had a Shore Hardness of 38O at t=0, 15O at t=5 sec, and 9O at t=60 sec.

The VSRs of Example 34 were observed to be more resilient during impact than the VSRs of Example 33. Specifically, a dropped 1" diameter steel ball bounced higher from an Example 34 VSR than from an Example 33 VSR, all else being equal.

Example 35 Addition-Cure VSR Based on 50% VPCB (15 wt % TFS Reinforcement and 75% TMB in 40% VTAS-Crosslinked 90-120 cSt STPDMS), 25% HTV Silicone, and 25% Borosilicone (100% TMB in 90-120 cSt STPDMS), Blended, Softened with ISA, and Crosslinked Using VX To 8.0 g of 50/25/25 Blend B were added 0.008 g ISA (0.1 wt %) and the softened blend was kneaded until homogenous. Added then were 0.060 g VX and several mg of white and red pigments (Smooth-On Silc-Pig White and Red). The full combination was kneaded until homogeneous, pressed into a Teflon mold, and heated to 165° C. for 30 minutes. The resulting pink VSR had a Shore Hardness of 47O at t=0, 23O at t=5 sec, and 14O at t=60 sec.

To a second 8.0 g portion of 50/25/25 Blend B were added 0.016 g ISA (0.2 wt %) and the crosslinking procedure was repeated, but with white and blue pigments (Smooth-On Silc-Pig White and Blue). The resulting sky blue VSR had a Shore Hardness of 45O at t=0, 23O at t=5 sec, and 18O at t=60 sec.

Example 36 Addition-Cure Foamed VSR Based on 50% VPCB (15 wt % TFS Reinforcement and 75% TMB in 40% VTAS-Crosslinked 90-120 cSt STPDMS), 25% HTV Silicone, and 25% Borosilicone (100% TMB in 90-120 cSt STPDMS), Blended and Crosslinked Using PMHS-PDMS and Platinum Catalyst and Blown with High-Pressure Nitrogen To 8.0 g of 50/25/25 Blend A were added 0.008 g ISA (0.1 wt %) and the softened blend was kneaded until homogenous. Added then were 0.100 g PMHS30 PDMS and 0.025 g of Platinum C. The full combination was kneaded until homogeneous. 2.0 g of this mixture were formed into a disk and place in a Teflon-coated high-pressure cell. The cell was filled with nitrogen gas at 1000 psi and this pressure was maintained for 2.5 hours. At the end of that period, the pressure was suddenly released and the mixture foamed immediately. The foamed mixture was heated to 110° C. for 30 minutes. The resulting foamed VSR had a density of approximately 0.2 g/cc.

Example 37 Condensation-Cure VSR Based on a VPCB (15 wt % TFS Reinforcement and 70% TMB in 65% VTAS-Crosslinked 90-120 cSt STPDMS), Blended and Crosslinked Using AMA A partially crosslinked silicone fluid was made by adding 19.993 g VTAS (65% saturation) to 834.3 g 90-120 cSt STPDMS. Prior to this addition, the STPDMS was degassed in vacuum for 3 minutes. The fluid was allowed to cure uncovered at room temperature for 24 hours, at which time its viscosity had increased to approximately 1000 cSt, approximately 10 times its starting value.

To this partially crosslinked STPDMS, 15 wt % TFS was added and dispersed using a 3-roll mill. To 948.8 g of this reinforced mixture, 0.949 g of ISAN (0.1 wt %) and 9.533 g of TMB (70% saturation) were added. The resulting VPCB was stirred until homogeneous, then spread out to dry at room temperature as a thin layer on a polyethylene plate.

To 5.0 g of this VPCB were added 0.050 g AMA (1 wt %) and the blend was kneaded until homogeneous. It was formed into a disk and placed on a polyethylene sheet to cure for several days. The resulting VSR had a Shore Hardness of 53O at t=0, 41O at t=5 sec, and 22O at t=60 sec.

Example 38 Passivation of a VSR with Silicone Sealant (Wacker A07)

The surface of a self-sticky VSR was coated with a thin layer of RTV silicone sealant (Wacker A07) and that sealant was allowed to cure overnight. The sealant formed a tight bond to the VSR surface and passivated it completely. A 40 wt % solution of that same sealant in anhydrous toluene worked equally well at passivating the other side of the same VSR.

Example 39 Passivation of a VSR with a Titanium Isopropoxide Solution

A 10 wt % solution of TIP in toluene was prepared. The surface of a self-sticky VSR was coated with a thin layer of that solution. The VSR almost immediately lost its stickiness and was completely passivated. Its surface felt like that of an ordinary silicone rubber, and it exhibited no self-adhesion.

Example 40 Passivation of a VSR with AMA

The surface of a self-sticky VSR was coated with a thin layer of AMA and allowed to cure overnight. The VSR lost its stickiness and was completely passivated.

Example 41 50% HTV Silicone and 50% 90-120 cSt STPDMS-Based 100%-Saturated Borosilicone, Softened with Acetic Acid and Crosslinked Using DCP A 90-120 cSt STPDMS-Based 100%-Saturated borosilicone was prepared by dissolving 15.470 g of BA in 172 g of IP and adding the solution to 1572.8 g of 90-120 cSt STPDMS. This mixture was heated to 90° C. for 2 days to evaporate the solvent and volatile reaction products and form a borosilicone VSR. The resulting borosilicone VSR was further dried by heating at 180° C. in a convection oven for 4 hours.

6.0 g of this 100% borosilicone was combined with 0.030 g of acetic acid (0.5 wt %) to obtain a softened borosilicone. This softened borosilicone was then blended with 6.0 g of Wacker R401/60 HTV (high-temperature vulcanizing) silicone and 0.360 g of 25% DCP (3 wt %) peroxide crosslinking agent. The completed mixture was cured at 165° C. for 60 minutes and became a VSR. The sample was put in a 200° C. oven for 4 hours as post-cure.

This VSR exhibited stretched exponential stress relaxation following sudden compressive or tensile strain. Its elastic modulus was measured to be 72 kPa and its viscous modulus to be 1.0 MPa. Its Shore Hardness was determined to be 40A, 52O at t=0 and 6A, 22O at t=60 sec.

Example 42 50% HTV Silicone and 50% 16-32 cSt STPDMS-Based 100%-Saturated Borosilicone, Softened with Acetic Acid and Crosslinked Using DCP A 16-32 cSt STPDMS-Based 100%-Saturated borosilicone was made by adding 1.261 g TMB (100% saturation) to 10 g 16-32 cSt STPDMS. The mixture was allowed to dry for several days until it became a solid film. 0.060 g of acetic acid (0.5 wt %) was added to the solid borosilicone to obtain a softened borosilicone. This softened borosilicone was then blended with 11.3 g of Wacker R401/60 HTV (high-temperature vulcanizing) silicone and 0.670 g of 25% DCP (3 wt %) peroxide crosslinking agent. This completed mixture was cured at 165° C. for 30 minutes, and a VSR was obtained. The sample was put in a 200° C. oven for 4 hours as post-cure.

This VSR exhibited stretched exponential stress relaxation following sudden compressive or tensile strain. Its elastic modulus was measured to be 200 kPa and its viscous modulus to be 4.2 MPa. Its Shore Hardness was determined to be 68A, 72O at t=0 and 12A, 31O at t=60 sec.

Example 43 50% HTV Silicone and 50% 90-120 cSt STPDMS-Based 100%-Saturated Borosilicone, Softened with Acetic Acid and Crosslinked Using VX The same 90-120 cSt STPDMS-Based 100%-Saturated borosilicone as in Example 41 was prepared. 10.5 g of the 100% borosilicone was combined with 0.026 g of acetic acid (0.25 wt %) to obtain a softened borosilicone. This softened borosilicone was then combined with 10.7 g of Wacker R401/60 HTV (high-temperature vulcanizing) silicone and 0.107 g VX (0.5 wt %) peroxide crosslinking agent. This completed mixture was cured at 165° C. for 30 minutes to obtain a VSR.

This VSR exhibited stretched exponential stress relaxation following sudden compressive or tensile strain. Its elastic modulus was measured to be 93 kPa and its viscous modulus to be 1.1 MPa. Its Shore Hardness was determined to be 36A, 48O at t=0 and 7A, 18O at t=60 sec.

Example 44 2 wt % Expancels in 75% HTV Silicone and 25% 90-120 cSt STPDMS-Based 100%-Saturated Borosilicone, Softened with Acetic Acid and Crosslinked Using VX The same 90-120 cSt STPDMS-Based 100%-Saturated borosilicone as in Example 41 was prepared. 1.5 g of the 100% borosilicone was combined with 0.0038 g of acetic acid (0.25 wt %) to obtain a softened borosilicone. This softened borosilicone was then blended with 4.5 g of Wacker R401/60 HTV (high-temperature vulcanizing) silicone, 0.121 g Expancel 930 DU 120 (2 wt %), and 0.032 g VX (0.54 wt %) peroxide crosslinking agent. This completed mixture was cured at 165° C. for 15 minutes to obtain a VSR.

This resulting foamed VSR had a low density, was resilient upon impact, and deformed slowly in response to sustained stress. Its Shore Hardness was 33A, 46O at t=0 and 22A, 35O at t=60 sec.

Example 45 50% HTV Silicone and 50% RTV Borosilicone and VX

An HTV (high-temperature vulcanizing) silicone and an RTV (room-temperature vulcanizing) borosilicone were blended. Both types of cures were initiated. 20 wt % TFS in 90-120 cSt STPDMS was dispersed using a 3-roll mill. 65% Saturation of TMB was added to this blend, and the volatile components were allowed to evaporate. 10 g of this dried 65% borosilicone was then combined with 0.330 g of AMA (3.3 wt %), 0.106 g PDEOS (40% Saturation), 0.124 g VX (>0.54 wt %), and 10 g Wacker R401/60 HTV silicone. The mixture cured overnight at 63° C. via a room-temperature (condensation reaction) cure. The resulting material was a viscoelastic solid.

A high-temperature cure was then initiated by heating the mixture to 165° C. for 15 minutes. The result was a robust VSR.

This VSR exhibited stretched exponential stress relaxation following sudden compressive or tensile strain. Its elastic modulus was measured to be 760 kPa and its viscous modulus to be 4.0 MPa. Its Shore Hardness was 60A, 68O at t=0 and 42A, 54O at t=60 sec.

Example 46 45% TEOS and 63% TMB in 30 wt % TFS Reinforced 90-120 cSt STPDMS 30 wt % TFS was dispersed in 90-120 cSt STPDMS using a 3-roll mill. To 13.0 g of this blend, 0.200 g AMA (2 wt %), 0.050 g acetic acid (0.5 wt %), 0.112 g TEOS (45% Saturation), and 0.104 g TMB (63% Saturation) were added. The mixture was degassed in vacuum, placed in a mold, and allowed to cure and dry at 63° C. in a dehydrator. The resulting material was highly viscoelastic.

This VSR exhibited stretched exponential stress relaxation following sudden compressive or tensile strain. Its elastic modulus was measured to be 190 kPa and its viscous modulus to be 2.2 MPa. Its Shore Hardness was 53A, 67O at t=0 and 30A, 45O at t=60 sec.

Example 47 Passivation of a VSR with a Titanium Isopropoxide Solution

A VSR sample was prepared using the same procedure as Example 56. This VSR had a somewhat sticky surface and exhibited strong self-adhesion.

A 10 wt % solution of TIP in toluene was prepared and a thin coating of that solution was painted on the surface of the VSR. The VSR almost immediately lost its stickiness. Its surface felt like that of an ordinary silicone rubber, and it exhibited no self-adhesion.

Example 48 50% VPCB, 25% HTV Silicone, and 25% Borosilicone, Blended and Crosslinked Using 200% PMHS-PDMS Copolymer and Platinum Catalyst A partially crosslinked silicone fluid was made by adding 5.239 g VTAS (90% Saturation) to 676.7 g 700-800 cSt STPDMS. Prior to this addition, the STPDMS was carefully dried and degassed by stirring it vigorously in vacuum for 90 minutes. The fluid bubbled rapidly as moisture and other volatiles boiled out of it, but after 90 minutes it stopped bubbling. The VTAS was added to the dried STPDMS fluid in a nitrogen-filled glove box and the mixture was returned to vacuum. It was stirred rapidly under vacuum for 5 minutes, when it again stopped bubbling. The mixture was sealed under an aluminum foil lid and warmed to 60° C. for 18 hours. It was then uncovered and allowed to continue curing at room temperature for 24 hours. At that time, the fluid's viscosity had increased to approximately 33,000 cSt, almost 50 times its starting value.

To this partially crosslinked STPDMS, 15 wt % TFS was added and dispersed using a 3-roll mill. To 713.8 g of this reinforced mixture, 0.310 g of ISAN (0.05 wt %) and 3.586 g of TMB (150% Saturation) were added. The resulting VPCB (VPCB-1) was stirred until homogeneous, then spread out to dry at room temperature as a thin layer on a polyethylene plate.

A moderated platinum solution (Platinum-1) was prepared by dispersing 5 wt % Pt (3-3.5% Platinum-divinyltetramethyldisiloxane complex, Karstedt catalyst—Gelest SIP6830.3) and 10 wt % TVTMTS (1,3,5,7-tetravinyl-1,3,5,7-tetramethylcyclotetrasiloxane moderator—Gelest SID4613.0) in 350 cSt STPDMS.

To 5.5 g of VPCB-1 were combined with 2.75 g of HTV silicone (Wacker R401/50), 2.75 g borosilicone (100% BA in 90-120 cSt STPDMS), and 0.010 g acetic acid. The resulting 50/25/25 blend was kneaded until homogeneous and then 0.200 g PMHS-PDMS copolymer (approximately 200% Saturation) and 0.050 g of Platinum-1 were added. The mixture was kneaded until homogeneous and then pressed into an aluminum mold with a Teflon lid. It was heated to 110° C. for 30 minutes and underwent the addition cure. It was removed from its mold and kept at 60° C. for 18 hours to complete its cure.

This sample exhibits stretched exponential relaxation, a form of relaxation first observed by Kohlrausch (Ann. Phys. Leipzig 12, 393 (1847)) and expressed in the formula:

$$q(t)=q_0 \exp[-(t/\tau)^\beta],$$

where t is time, q(t) is the physical characteristic being described by the relaxation, $q_0$ is that characteristic at time t=0, $\tau$ is a characteristic time constant, and $\beta$ is the stretching exponent and is $0 \leq \beta \leq 1$. For $\beta=1$, this relaxation process is ordinary exponential relaxation. The as-cured sample had a characteristic time constant of 481 seconds and a stretching exponent of 0.29.

That extremely slow relaxation rate suggests that the boron-bridge crosslinks in this as-cured sample were more permanent than temporary. A likely explanation for that result is that the PMHS-PDMS copolymer, present in substantial excess in the pre-cure mixture, reacted with virtually all of the hydroxyl, carboxyl, and silanol groups in the mixture during the addition cure and left the as-cured sample nearly devoid of reactive groups that could open the boron-bridge crosslinks. With almost no boron-bridge-opening-chemicals present, the VSR appeared approximately elastic on timescales shorter than 1 minute. This as-cured VSR had a Shore Hardness of 42O at t=0, 42O at t=5 sec, and 41O at t=60 sec.

Exposing this sample to 60% relative humidity air at 20° C. for 30 days reduced its characteristic time constant to 6.6 seconds and increased its stretching exponent of 0.62. This faster relaxation rate suggests that the boron-bridge crosslinks in this atmosphere-equilibrated sample are truly temporary. A likely explanation for that result is that atmospheric moisture diffused into the sample and acted as a boron-bridge-opening-chemical, thereby allowing the sample to exhibit viscoelastic behavior on a timescale shorter than 1 minute. This atmosphere-equilibrated VSR had a Shore Hardness of 42O at t=0, 32O at t=5 sec, and 19O at t=60 sec.

Example 49 Arizona Century 1105 Softened 60% MTEOS and 50% TMB in 15 wt % TFS-Reinforced 90-120 cSt STPDMS 15 wt % TFS was dispersed in 90-120 cSt STPDMS using a 3-roll mill. To 40.0 g of this blend, 0.800 g Arizona Century 1105 (2 wt %), 0.289 g TMB (50% Saturation), 0.700 g AMA (2 wt %), and 0.594 g MTEOS (60% Saturation) were added. The mixture was degassed in vacuum, placed in a sheet mold measuring 3"×3"×0.1875", and allowed to cure for 24 hours at 60° C. in a dehydrator. This VSR has a somewhat greasy surface.

Example 50 Peroxide-Cure VSR Based on 50% HTV Silicone and 50% (90-120 cSt STPDMS-Based 200%-Saturated Titanosilicone), Blended and Crosslinked Using VX 90-120 cSt STPDMS-based 100%-Saturated titanosilicone was prepared by adding 3.384 g TIP (200% saturation) to 50.0 g 90-120 cSt STPDMS. The mixture was heated to 175° C. for 4 hours in a convection oven to evaporate the volatile reaction products. The mixture was further dried as a thin sheet at 63° C. in a dehydrator overnight.

16.0 g of the titanosilicone was combined with 16.0 g of Wacker R401/50 HTV silicone and kneaded together until the mixture was homogeneous. 0.080 g of VX crosslinker was added, and the mixture was kneaded again until homogeneous. The sticky, viscous blend was squeezed into a Teflon sheet mold, 3"×3"×0.1875" deep, and the mold was capped with a Teflon sheet and placed it in an aluminum press, which was bolted closed with the help of a 20 ton hydraulic press. The press and mold assembly were heated to 165° C. for 30 minutes. After cooling the mold to room temperature, the finished VSR sample was removed.

This VSR had a Shore Hardness of 18A, 43O at t=0, 4A, 24O at t=5 sec, and 0A, 10O at t=60 sec. It was stickier than borosilicone-based VSRs.

Example 51 Peroxide-Cure VSR Based on 50% HTV Silicone and 50% (ISAN-Softened 90-120 cSt STPDMS-Based Borotitanosilicone), Blended and Crosslinked Using VX ISAN softened 90-120 cSt STPDMS-based 100%-Saturated borotitanosilicone was made by adding 0.550 g TMB (67% saturation), 0.558 g TIP (33% saturation), and 0.125 g ISAN (0.25 wt %) to 50.0 g 90-120 cSt STPDMS. The mixture was heated to 175° C. for 4 hours in a convection oven to evaporate the volatile reaction products and further dried as a thin sheet at 63° C. in a dehydrator overnight.

To 16.0 g of the borotitanosilicone, 0.050 g TMB (25% saturation) was added, and the mixture was allowed to dry in the dehydrator at 63° C. for several hours. The mixture was then combined with 16.0 g of Wacker R401/50 HTV silicone and kneaded together until the mixture was homogeneous. 0.080 g of VX crosslinker was added and the mixture was kneaded again until homogeneous. The sticky, viscous blend was squeezed into a Teflon sheet mold, 3"×3"×0.1875" deep, and the mold was capped with a Teflon sheet and placed it in an aluminum press, which was bolted closed with the help of a 20 ton hydraulic press. The press and mold assembly was heated to 165° C. for 30 minutes. After cooling the mold to room temperature, the finished VSR sample was removed.

This VSR had a Shore Hardness of 14A, 40O at t=0, 3A, 16O at t=5 sec, and 0A, 6O at t=60 sec. It was much stickier than borosilicone-based VSRs.

Example 52 25%, 30%, 35%, 40%, 50%, 60% VTAS in 90-120 cSt STPDMS and 30%, 40%, 50%, 60% MTEOS in 90-120 cSt STPDMS, Blended and Cured with AMA Ten 20 g samples of 90-120 cSt STPDMS were prepared. To these ten samples were added, respective: 0.184 g VTAS (25% saturation), 0.221 g VTAS (30% saturation), 0.258 g VTAS (35% saturation), 0.295 g VTAS (40% saturation), 0.369 g VTAS (50% saturation), 0.442 g VTAS (60% saturation), 0.170 g MTEOS (30% saturation), 0.226 g MTEOS (40% saturation), 0.283 g MTEOS (50% saturation), 0.340 g MTEOS (60% saturation).

To each of the ten samples, 0.050 g AMA (0.25 wt %) were added and stirred in carefully. The ten samples were warmed to 60° C. and allowed to cure for approximately 24 hours. All ten samples cured to form solid silicone elastomers, although the 30% MTEOS and 40% MTEOS samples were quite soft.

The gelation thresholds for VTAS or MTEOS in STPDMS, predicted theoretically by Flory (Paul J. Flory, J. Phys. Chem. 46, 132 (1942)), Stockmayer (Walter H. Stockmayer, J. Chem. Phys. 11, 45 (1943)), and others occurs at 50% saturation. That 25% VTAS and 30% MTEOS were able to cure STPDMS and form solid silicone elastomers suggests that considerable homocondensation of the STPDMS chains occurred, perhaps facilitated by the AMA catalyst. By eliminating many of the silanol groups, this homocondensation increased the effective saturation levels of VTAS and MTEOS and caused these samples to exceed the gelation threshold and become solid silicone elastomers.

Example 53 60% MTEOS and 30% TMB in 15 wt % TFS-Reinforced 90-120 cSt STPDMS 15 wt % TFS (Cabot) was dispersed in 90-120 cSt STPDMS using a three-roll mill. To 40.0 g of this blend were added one at a time: <0.020 g pigment, 0.198 TMB (30% Saturation), 0.040 g acetic acid (0.1 wt %), 0.679 g MTEOS (60% saturation), and 0.400 g AMA (1 wt %). The blend's viscosity increased significantly upon the addition of TMB, but decreased significantly upon addition of the acetic acid. The mixture was degassed in vacuum, poured into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 57O at t=0 and 43O at t=600 sec.

Example 54 55% MTEOS and 35% TMB in 15 wt % TFS-Reinforced 90-120 cSt STPDMS 15 wt % TFS (Cabot) was dispersed in 90-120 cSt STPDMS using a three-roll mill. To 40.0 g of this blend were added one at a time: <0.020 g pigment, 0.231 TMB (35% Saturation), 0.040 g acetic acid (0.1 wt %), 0.623 MTEOS (55% saturation), and 0.400 g AMA (1 wt %). The blend's viscosity increased significantly upon the addition of TMB, but decreased significantly upon addition of the acetic acid. The mixture was degassed in vacuum, pouring into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 55O at t=0 and 37O at t=600 sec.

Example 55 50% MTEOS and 40% TMB in 15 wt % TFS-Reinforced 90-120 cSt STPDMS 15 wt % TFS (Cabot) was dispersed in 90-120 cSt STPDMS using a three-roll mill. To 40.0 g of this blend were added one at a time: <0.020 g pigment, 0.264 TMB (40% Saturation), 0.040 g acetic acid (0.1 wt %), 0.566 MTEOS (55% saturation), and 0.400 g AMA (1 wt %). The blend's viscosity increased significantly upon the addition of TMB, but decreased significantly upon addition of the acetic acid. The mixture was degassed in vacuum, poured into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 56O at t=0 and 33O at t=600 sec.

Example 56 45% MTEOS and 45% TMB in 15 wt % TFS-Reinforced 90-120 cSt STPDMS 15 wt % TFS (Cabot) was dispersed in 90-120 cSt STPDMS using a three-roll mill. To 40.0 g of this blend were added one at a time: <0.020 g pigment, 0.297 TMB (45% Saturation), 0.040 g acetic acid (0.1 wt %), 0.509 MTEOS (45% saturation), and 0.400 g AMA (1 wt %). The blend's viscosity increased significantly upon the addition of TMB, but decreased significantly upon addition of the acetic acid. The mixture was degassed in vacuum, poured into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 54O at t=0 and 28O at t=600 sec.

Example 57 35% MTEOS and 35% TMB in 15 wt % TFS-Reinforced 90-120 cSt STPDMS 15 wt % TFS (Cabot) was dispersed in 90-120 cSt STPDMS using a three-roll mill. To 40.0 g of this blend were added one at a time: <0.020 g pigment, 0.231 TMB (35% Saturation), 0.040 g acetic acid (0.1 wt %), 0.396 MTEOS (35% saturation), and 0.400 g AMA (1 wt %). The blend's viscosity increased significantly upon the addition of TMB, but decreased significantly upon addition of the acetic acid. The mixture was degassed in vacuum, poured into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 50O at t=0 and 25O at t=600 sec.

Example 58 60% MTEOS and 30% TMB in 15 wt % TFS-Reinforced 700-800 cSt STPDMS 20 wt % TFS (Gelest) was dispersed in 700-800 cSt STPDMS using a three-roll mill. To 40.0 g of this blend were added one at a time: <0.020 g pigment, 0.046 TMB (30% Saturation), 0.040 g acetic acid (0.1 wt %), 0.159 MTEOS (60% saturation), and 0.400 g AMA (1 wt %). The blend's viscosity increased significantly upon the addition of TMB, but decreased significantly upon addition of the acetic acid. The mixture was degassed in vacuum, poured into a sheet mold that measured 3"×3"×0.1875" and allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 33O at t=0 and 17O at t=600 sec.

Example 59 60% MTEOS and 35% TMB in 15 wt % TFS-Reinforced 90-120 cSt STPDMS 15 wt % TFS (Cabot) was dispersed in 90-120 cSt STPDMS using a three-roll mill. To 52.0 g of this blend were added one at a time: <0.020 g pigment, 0.261 TMB (35% Saturation), 0.052 g acetic acid (0.1 wt %), 0.768 g MTEOS (60% saturation), and 0.400 g AMA (0.8 wt %). The blend's viscosity increased significantly upon the addition of TMB, but decreased significantly upon addition of the acetic acid. The mixture was degassed in vacuum and 40 g were poured into a sheet mold that measured 3"×3"×0.1875". The sample was allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 58O at t=0, 56O at t=5 sec, 51O at t=60 sec, 42O at t=300 sec, and 36O at t=600 sec.

Example 60 0.1 wt % ISA, 60% MTEOS, and 35% TMB in 15 wt % TFS-Reinforced 90-120 cSt STPDMS 15 wt % TFS (Cabot) was dispersed in 90-120 cSt STPDMS using a three-roll mill. To 52.0 g of this blend were added one at a time: <0.020 g pigment, 0.261 TMB (35% Saturation), 0.052 g acetic acid (0.1 wt %), 0.768 g MTEOS (60% saturation), and 0.400 g AMA (0.8 wt %). The blend's viscosity increased significantly upon the addition of TMB, but decreased significantly upon addition of the acetic acid. The mixture was degassed in vacuum and 40 g were poured into a sheet mold that measured 3"×3"×0.1875". The sample was allowed to cure and dry for 24 hours at 60° C. in a dehydrator. It was then removed from its mold. This VSR was kept at 60° C. for an additional month to ensure that it was completely cured and dried, and that all the acetic acid had evaporated. It has Shore Hardness 58O at t=0, 49O at t=5 sec, 33O at t=60 sec, 29O at t=300 sec, and 26O at t=600 sec.

Example 61 Passivation of a VSR with a Titanium Isopropoxide Solution

A 10 g VSR disk, compositionally equivalent to Example 29, was painted with a thin layer of Struksilon 8018. The painted disk became relatively non-sticky and would not stick to itself or to other VSRs. In contrast, an unpainted disk of the same VSR was somewhat sticky and would stick to itself temporarily.

Example 62 VSR Made From Sulfuric-Acid-Treated Partially Crosslinked STPDMS, Using the Peroxide Cure A partially crosslinked STPDMS fluid was prepared by combining 50.0 g of dried 90-120 cSt STPDMS (Gelest DMS-S21) and 0.737 g VTAS. The STPDMS had been dried by heating it to 100° C. and bubbling dry nitrogen through it for 24 hours. After curing at 60° C. for more than 72 hours, this partially crosslinked STPDMS fluid was allowed to cool to room temperature. It remained a low-viscosity liquid.

To 7.0 g of that fluid was added approximately 1 mg of sulfuric acid. The mixture was stirred vigorously under vacuum and its viscosity began to increase. When its viscosity had reached approximately 15,000 cSt, 0.116 g of TMB (100% saturation) were added and the fluid became a borosilicone. After kneading the borosilicone in a slip roll, it was allowed to dry overnight.

To the 7.0 g of borosilicone were added 0.007 g iso-stearic acid (0.1 wt %), 0.007 g acetic acid (0.1 wt %), and 0.070 g VX (1.0 wt %). After kneading to homogeneity, the blend was pressed into a Teflon disk mold and vulcanized at 165° C. for 30 minutes. The resulting disk was a VSR.

Example 63 VPCB with 0.1M Vinyl Groups Per Kilogram Made From Sulfuric-Acid-Treated Partially Crosslinked STPDMS A partially crosslinked STPDMS fluid was prepared by combining 500.0 g of dried 90-120 cSt STPDMS (Gelest DMS-S21) and 11.613 g VTAS. The STPDMS had been dried by degassing it in vacuum for 20 minutes. The fluid was allowed to cure in a sealed container for 7 days at 60° C. and then cooled to room temperature. Its finished viscosity was approximately 420 cSt.

A 5% dispersion of 0.250 g sulfuric acid in 5.0 g of 350 cSt PDMS silicone fluid was prepared. Rapid shaking resulted in microscopic droplets of sulfuric acid suspended in the silicone fluid.

To 50.0 g of the partially crosslinked STPDMS was added 0.044 g of the 5% sulfuric acid dispersion. The mixture was stirred carefully and its viscosity monitored at approximately 30 minute intervals. After 228 minutes, its viscosity had increased to approximately 8100 cSt. To this thickened fluid was added 0.020 g of precipitated calcium carbonate powder (Solvay Winnofil SPM). The mixture was stirred carefully to facilitate neutralization of the sulfuric acid.

To the fluid were added 1.5 g of TMB. When stirred, this mixture immediately thickened into a borosilicone putty. The density of vinyl groups in this VPCB is approximately 0.1 M/kg.

Example 64 VPCB with 0.075M Vinyl Groups Per Kilogram Made From Sulfuric-Acid-Treated Partially Crosslinked STPDMS A partially crosslinked STPDMS fluid was prepared by combining 500.0 g of dried 90-120 cSt STPDMS (Gelest DMS-S21) and 8.710 g VTAS. The STPDMS had been dried by degassing it in vacuum for 20 minutes. The fluid was allowed to cure in a sealed container for 7 days at 60° C. and then cooled to room temperature. Its finished viscosity was approximately 160 cSt.

To 50.0 g of the partially crosslinked STPDMS was added 0.043 g of the 5% sulfuric acid dispersion from Example 63. The mixture was stirred carefully and its viscosity monitored at approximately 30 minute intervals. After 191 minutes, its viscosity had increased to approximately 840 cSt and was no longer changing. The fluid was then vacuum degassed and its viscosity began to increase rapidly. After 2 hours in vacuum, its viscosity had reached 12,800 cSt. To this thickened fluid was added 0.020 g of precipitated calcium carbonate powder (Solvay Winnofil SPM). The mixture was stirred carefully to facilitate neutralization of the sulfuric acid.

To the fluid was added 0.50 g of TMB. When stirred, this mixture immediately thickened into a borosilicone putty. The density of vinyl groups in this VPCB is approximately 0.075 M/kg.

Example 65 VPCB with 0.05M Vinyl Groups Per Kilogram Made From Sulfuric-Acid-Treated Partially Crosslinked STPDMS A partially crosslinked STPDMS fluid was prepared by combining 500.0 g of dried 90-120 cSt STPDMS (Gelest DMS-S21) and 5.807 g VTAS. The STPDMS had been dried by degassing it in vacuum for 20 minutes. The fluid was allowed to cure in a sealed container for 7 days at 60° C. and then cooled to room temperature. Its finished viscosity was approximately 100 cSt.

To 50.0 g of the partially crosslinked STPDMS was added 0.043 g of the 5% sulfuric acid dispersion from Example 63. The mixture was stirred carefully and its viscosity monitored at approximately 30 minute intervals. After 187 minutes, its viscosity had increased to approximately 360 cSt and was no longer changing. The fluid was then vacuum degassed and its viscosity began to increase rapidly. After 3 hours in vacuum, its viscosity had reached 11,100 cSt. To this thickened fluid was added 0.020 g of precipitated calcium carbonate powder (Solvay Winnofil SPM). The mixture was stirred carefully to facilitate neutralization of the sulfuric acid.

To the fluid was added 0.40 g of TMB. When stirred, this mixture immediately thickened into a borosilicone putty. The density of vinyl groups in this VPCB is approximately 0.05 M/kg.

Example 66 VPCB with 0.033M Vinyl Groups Per Kilogram Made From Sulfuric-Acid-Treated Partially Crosslinked STPDMS A partially crosslinked STPDMS fluid was prepared by combining 100.0 g of dried 90-120 cSt STPDMS (Gelest DMS-S21), 400.0 g of dried 700-800 cSt STPDMS (Gelest DMS-S27), and 3.832 g VTAS. The STPDMS had been dried by degassing it in vacuum for 20 minutes. The fluid was allowed to cure in a sealed container for 7 days at 60° C. and then cooled to room temperature. Its finished viscosity was approximately 11,400 cSt.

To 50.0 g of the partially crosslinked STPDMS was added 0.041 g of the 5% sulfuric acid dispersion from Example 63. The mixture was stirred carefully and its viscosity monitored at approximately 30 minute intervals. After 148 minutes, its viscosity had increased to approximately 36,700 cSt. To this thickened fluid was added 0.018 g of precipitated calcium carbonate powder (Solvay Winnofil SPM). The mixture was stirred carefully to facilitate neutralization of the sulfuric acid.

To the fluid was added 0.40 g of TMB. When stirred, this mixture immediately thickened into a borosilicone putty. The density of vinyl groups in this VPCB is approximately 0.033 M/kg.

Example 67 VPCB with 0.025M Vinyl Groups Per Kilogram Made From Sulfuric-Acid-Treated Partially Crosslinked STPDMS A partially crosslinked STPDMS fluid was prepared by combining 500.0 g of dried 700-800 cSt STPDMS (Gelest DMS-S27) and 2.903 g VTAS. The STPDMS had been dried by degassing it in vacuum for 20 minutes. The fluid was allowed to cure in a sealed container for 7 days at 60° C. and then cooled to room temperature. Its finished viscosity was approximately 17,200 cSt.

To 50.0 g of the partially crosslinked STPDMS was added 0.041 g of the 5% sulfuric acid dispersion from Example 63. The mixture was stirred carefully and its viscosity monitored at approximately 30 minute intervals. After 151 minutes, its viscosity had increased to approximately 49,200 cSt. To this thickened fluid was added 0.015 g of precipitated calcium carbonate powder (Solvay Winnofil SPM). The mixture was stirred carefully to facilitate neutralization of the sulfuric acid.

To the fluid was added 0.35 g of TMB. When stirred, this mixture immediately thickened into a borosilicone putty. The density of vinyl groups in this VPCB is approximately 0.025 M/kg.

Example 68 VPCB Made From Partially Crosslinked 90-120 cSt STPDMS Cured at 200° C.

100.0 g of 90-120 cSt STPDMS (Gelest DMS-S21) was heated to 140° C. and, while stirring rapidly with a magnetic stirrer, 2.58 g VTAS was added. The mixture was further heated to about 200° C. and the stirring continued. After 50 minutes, the viscosity of the mixture was still low so an additional 0.368 g of VTAS was added. The fluid began to gel within seconds. Before the fluid could solidify, it was cooled quickly to room temperature and approximately 0.165 g TMB were added to convert it to a VPCB. It was left to dry in the open air overnight.

Example 69 VPCB Made From Partially Crosslinked 90-120 cSt STPDMS Cured at 190° C.

100.0 g of 90-120 cSt STPDMS (Gelest DMS-S21, Lot BE-12804) was heated to 165° C. and, while stirring rapidly with a magnetic stirrer, 2.77 g VTAS was added. The mixture was further heated to about 190° C. and the stirring continued. After 60 minutes, the viscosity of the mixture began to increase noticeably. After 80 minutes, the mixture had partially gelled. Before the fluid could solidify, it was cooled quickly to room temperature and approximately 0.165 g TMB were added to convert it to a VPCB. It was left to dry in the open air overnight.

Example 70 VPCB Made From Partially Crosslinked 90-120 cSt STPDMS Cured at 190° C.

100.0 g of 90-120 cSt STPDMS (Gelest DMS-S21) was heated to 150° C. and, while stirring rapidly with a magnetic stirrer, 2.40 g VTAS was added. The mixture was further heated to about 190° C. and the stirring continued. After 60 minutes, the viscosity of the mixture began to increase noticeably. After 80 minutes, the mixture's viscosity had increased to the point where the magnetic stirrer could no longer turn properly. The fluid was cooled to room temperature and approximately 0.165 g TMB were added to convert it to a VPCB. It was left to dry in the open air overnight.

Example 71 VPCB Made From Partially Crosslinked 700-800 cSt STPDMS Cured at 182° C.

300.0 g of 700-800 cSt STPDMS (Gelest DMS-S27) was heated to 150° C. and, while stirring rapidly with a magnetic stirrer, 2.44 g VTAS was added. The mixture was further heated to about 182° C. and the stirring continued. After 90 minutes, the viscosity of the mixture began to increase noticeably. The fluid was cooled to about 100° C. and 2.3 g of TMB were added to convert it to a VPCB. It was left to dry in the open air overnight.

Example 72 VPCB Made From Partially Crosslinked 90-120 cSt STPDMS Cured at 180° C.

400.0 g of 90-120 cSt STPDMS (Gelest DMS-S21) was heated to 100° C. and 8.848 g VTAS was added while stirring at 500 rpm with a high-shear immersion blade. The temperature was increased gradually to about 180° C. After 170 minutes, drips of fluid from a glass rod produced stringy tails. The vulcanizable partially crosslinked silicone fluid was allowed to cool to room temperature and its viscosity was measured at about 2700 cSt. When TMB was added to a small portion of this fluid, it immediately formed a VPCB.

Example 73 VPCB Made From Partially Crosslinked 90-120 cSt STPDMS Cured at 180° C.

400.0 g of 90-120 cSt STPDMS (Gelest DMS-S21) that had been stored in an open container for several months was heated to 100° C. and 9.585 g VTAS was added while stirring at 250 rpm with a high-shear immersion blade. The temperature was increased gradually to about 180° C. After 220 minutes, drips of fluid from a glass rod produced stringy tails. The vulcanizable partially crosslinked silicone fluid was allowed to cool to room temperature and its viscosity was measured at about 7000 cSt. When TMB was added to a small portion of this fluid, it immediately formed a VPCB.

Example 74 Peroxide-Cure VSR Based on 67% VPCB (4.5 wt % VTAS and 1.7 wt % TMB in 70 cSt STPDMS) and 33% High-Consistency Silicone Rubber (HCR) (Wacker R420/50), Blended and Softened with 0.5 wt % Oleic Acid, and Crosslinked Using 0.57 wt % VX Peroxide 3069.0 g of 70 cSt STPDMS (Masil SFR 70, Emerald Performance Materials) was dried in vacuum for 5 minutes. To this fluid was slowly added 138.1 g VTAS while stirring rapidly. The beaker containing this mixture was heated to approximately 120° C. in a convection oven for 350 minutes and the partially crosslinked silicone fluid was then allowed to cool. The dynamic viscosity of this PCS at room temperature was 300 mPa·s.

To 50.0 g of the PCS were added 0.375 g oleic acid (0.50 wt %) and then 0.850 g of TMB (1.7 wt %). The viscous mixture was vacuum dried for about 5 minutes. 25.0 g of HCR silicone (Wacker Elastosil R420/50) were added and the blend was kneaded to homogeneity in a slip roll. It was spread as thin sheets on Teflon and allowed to equilibrate and dry for several hours at 70° C.

To 10.5 g of the blend were added 0.060 g VX (0.57 wt %) and the vulcanizable material was kneaded to homogeneity in the slip roll. It was placed in a Teflon mold and cured at 160° C. for 15 minutes. The resulting viscoelastic silicone rubber had a Shore Hardness of 54O at t=0, 32O at t=5 sec, and 19O at t=60 sec.

Example 75 Peroxide-Cure VSR Based on 67% VPCB (3.0 wt % VTAS and 0.95 wt % TMB in 100 cSt STPDMS) and 33% HCR (Wacker R420/50), Blended and Softened with 0.5 wt % Oleic Acid, and Crosslinked Using 0.57 wt % VX Peroxide 3100.0 g of 100 cSt STPDMS (Masil SFR 100, Emerald Performance Materials) was dried in vacuum for 5 minutes.

To this fluid was slowly added 93.0 g VTAS while stirring rapidly. The beaker containing this mixture was heated to approximately 120° C. in a convection oven for 350 minutes and the partially crosslinked silicone fluid was then allowed to cool. The dynamic viscosity of this PCS at room temperature was 510 mPa·s.

To 50.0 g of the PCS were added 0.375 g oleic acid (0.50 wt %) and then 0.475 g of TMB (0.95 wt %). The viscous mixture was vacuum dried for about 5 minutes. 25.0 g of HCR silicone (Wacker Elastosil R420/50) were added and the blend was kneaded to homogeneity in a slip roll. It was spread as thin sheets on Teflon and allowed to equilibrate and dry for several hours at 70° C.

To 10.5 g of the blend were added 0.060 g VX (0.57 wt %) and the vulcanizable material was kneaded to homogeneity in the slip roll. It was placed in a Teflon mold and cured at 160° C. for 15 minutes. The resulting viscoelastic silicone rubber had a Shore Hardness of 48O at t=0, 21O at t=5 sec, and 16O at t=60 sec.

Example 76 Peroxide-Cure VSR Based on 67% VPCB (0.7 wt % VTAS and 0.40 wt % TMB in 750 cSt STPDMS) and 33% HCR (Wacker R420/50), Blended and Softened with 0.4 wt % Oleic Acid, and Crosslinked Using 0.38 wt % VX Peroxide 1172.80 g of 750 cSt STPDMS (Masil SFR 750, Emerald Performance Materials) was dried in vacuum for 5 minutes. To this fluid was slowly added 8.210 g VTAS while stirring rapidly. The beaker containing this mixture was heated to approximately 135° C. in a convection oven for 300 minutes and the partially crosslinked silicone fluid was then allowed to cool. The dynamic viscosity of this PCS at room temperature was 7000 mPa·s.

To 50.0 g of the PCS were added 0.300 g oleic acid (0.40 wt %) and then 0.200 g of TMB (0.40 wt %). The viscous mixture was vacuum dried for about 5 minutes. 25.0 g of HCR silicone (Wacker Elastosil R420/50) were added and the blend was kneaded to homogeneity in a slip roll. It was spread as thin sheets on Teflon and allowed to equilibrate and dry for several hours at 70° C.

To 10.5 g of the blend were added 0.040 g VX (0.38 wt %) and the vulcanizable material was kneaded to homogeneity in the slip roll. It was placed in a Teflon mold and cured at 160° C. for 15 minutes. The resulting viscoelastic silicone rubber had a Shore Hardness of 28O at t=0, 7O at t=5 sec, and 2O at t=60 sec.

Example 77 Peroxide-Cure VSR Based on 67% VPCB (0.4 wt % VTAS and 0.35 wt % TMB in 2000 cSt STPDMS) and 33% HCR (Wacker R420/50), Blended and Softened with 0.2 wt % Oleic Acid, and Crosslinked Using 0.38 wt % VX Peroxide 1012.8 g of 2000 cSt STPDMS (Masil SFR 2000, Emerald Performance Materials) was dried in vacuum for 5 minutes. To this fluid was slowly added 4.051 g VTAS while stirring rapidly. The beaker containing this mixture was heated to approximately 135° C. in a convection oven for 300 minutes and the partially crosslinked silicone fluid was then allowed to cool. The dynamic viscosity of this PCS at room temperature was 14,500 mPa·s.

To 50.0 g of the PCS were added 0.150 g oleic acid (0.2 wt %) and then 0.175 g of TMB (0.40 wt %). The viscous mixture was vacuum dried for about 5 minutes. 25.0 g of HCR silicone (Wacker Elastosil R420/50) were added and the blend was kneaded to homogeneity in a slip roll. It was spread as thin sheets on Teflon and allowed to equilibrate and dry for several hours at 70° C.

To 10.5 g of the blend were added 0.040 g VX (0.38 wt %) and the vulcanizable material was kneaded to homogeneity in the slip roll. It was placed in a Teflon mold and cured at 160° C. for 15 minutes. The resulting viscoelastic silicone rubber had a Shore Hardness of 25O at t=0, 11O at t=5 sec, and 5O at t=60 sec.

The claimed invention is:

1. A cured viscoelastic silicone rubber composition comprising:
   (a) at least one crosslinked polyorganosiloxane;
   (b) sufficient permanent crosslinks to give the composition an equilibrium shape;
   (c) sufficient temporary crosslinks to give the composition a stiffness that is greater on short timescales than it is on long timescales; and
   (d) at least one softening agent present in an amount sufficient to make the average lifetime of the temporary crosslink of shorter duration than the average lifetime of the temporary crosslink in the absence of the softening agent.

2. The cured viscoelastic silicone rubber composition of claim 1, wherein the at least one crosslinked polyorganosiloxane is prepared from a polyorganosiloxane comprising at least one ethylenically-unsaturated group.

3. The cured viscoelastic silicone rubber composition of claim 1, wherein the at least one crosslinked polyorganosiloxane is prepared from a branched polyorganosiloxane.

4. The cured viscoelastic silicone rubber composition of claim 3, further comprising at least one crosslinked polyorganosiloxane prepared from a linear polyorganosiloxane.

5. The cured viscoelastic silicone rubber composition of claim 1, wherein:
   (a) the crosslinked polyorganosiloxane is prepared from a silanol-terminated polyorganosiloxane polymer of formula (I)

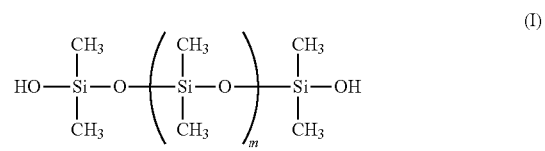

(I)

having a molecular weight ranging from 400 to 50,000 Dalton and a viscosity ranging from 10 to 10,000 cSt and preferably from about 15 to 2,000 cSt and wherein "m" is 1 or greater and represents the number of the repeating units in parentheses to give the molecular weight of the particular polymer;
   (b) the permanent crosslinks are formed using a permanent crosslinking agent selected from a vinyltriacetoxysilane, vinyltrimethoxysilane, vinyltrichlorosilane, and vinyltriethoxysilane; and
   (c) the temporary crosslinks are formed using a temporary crosslinking agent selected from a boron-containing compound, a titanium-containing compound, an aluminum-containing compound, or a mixture thereof.

6. The cured viscoelastic silicone rubber composition of claim 1, wherein the crosslinked polyorganosiloxane is prepared from a silanol-terminated polyorganosiloxane.

7. The cured viscoelastic silicone rubber composition of claim 1, wherein the at least one crosslinked polyorganosiloxane is partially crosslinked and has at least three terminal silanols.

8. The cured viscoelastic silicone rubber composition of claim 1, wherein the at least one crosslinked polyorganosiloxane is prepared from a branched polyorganosiloxane having at least one ethylenically-unsaturated group.

9. The cured viscoelastic silicone rubber composition of claim 1, wherein the permanent crosslinks are formed using a permanent crosslinking agent selected from a siloxane bond-forming crosslinking agent, a carbon-carbon bond-forming crosslinking agent, or a mixture thereof.

10. The cured viscoelastic silicone rubber composition of claim 1, wherein the permanent crosslinks are formed using condensation-cure crosslinking, addition-cure crosslinking, peroxide cure crosslinking, or a mixture thereof.

11. The cured viscoelastic silicone rubber composition of claim 1, wherein the permanent crosslinks are formed using a permanent crosslinking agent in an amount ranging from about 0.02 wt % to 10.0 wt %.

12. The cured viscoelastic silicone rubber composition of claim 1, wherein the temporary crosslinks are formed using a temporary crosslinking agent selected from a boron-containing compound.

13. The cured viscoelastic silicone rubber composition of claim 12, wherein the boron-containing compound is selected from boric acid, trimethyl borate, triethyl borate, and triisopropyl borate.

14. The cured viscoelastic silicone rubber composition of claim 1, wherein the temporary crosslinks are formed using a temporary crosslinking agent in an amount ranging from about 0.01 wt % to 20.0 wt %.

15. The cured viscoelastic silicone rubber composition of claim 1, wherein the softening agent is present in an amount ranging from about 0.01 wt % to 5.0 wt %.

16. The cured viscoelastic silicone rubber composition of claim 1, further comprising at least one filler.

17. The cured viscoelastic silicone rubber composition of claim 1, further comprising optionally at least one additive, or at least one catalyst, or at least one blowing agent, or at least one passivating agent, or mixtures thereof.

18. A method of making the cured viscoelastic silicone rubber composition of claim 1, comprising the steps of:
(1)(a) reacting at least one polyorganosiloxane with at least one temporary crosslinking agent or group under conditions sufficient to produce a temporary-crosslink-containing polyorganosiloxane, and
(1)(b) adding at least one permanent crosslinking agent or group, a catalyst, an optional filler, and an optional foaming agent to the temporary-crosslink-containing polyorganosiloxane to form a first mixture (1)(c); or
(2)(a) combining at least one polyorganosiloxane with at least one permanent crosslinking agent or group, a catalyst, an optional filler, and an optional foaming agent to form a second mixture (2)(c), and
(2)(b) adding at least one temporary crosslinking agent, group, or temporary-crosslink-containing polyorganosiloxane to the second mixture (2)(c); and
curing the first mixture (1)(c) or second mixture (2)(c) under conditions sufficient to form the cured viscoelastic silicone rubber composition.

19. The method of claim 18, further comprising the step of:
mixing the at least one polyorganosiloxane with a filler prior to reaction with the at least one temporary crosslinking agent (1)(a); or
mixing the at least one polyorganosiloxane with a filler prior to the combining step (2)(a).

20. The method of claim 18, further comprising, prior to or during the curing step, the steps of:
injecting a pressurized gas into the first or second mixture; and
releasing the pressure to form a foamed viscoelastic silicone rubber composition.

21. The method of claim 18, further comprising, prior to the curing step, the step of:
placing the first or second mixture in a mold.

22. A shaped article comprising the cured viscoelastic silicone rubber composition of claim 1.

23. The cured viscoelastic silicone rubber composition of claim 1, wherein the permanent crosslinks are formed without the use of a permanent crosslinking agent.

24. The cured viscoelastic silicone rubber composition of claim 1, wherein the permanent crosslinks are formed from at least one permanent crosslinkable group present in at least one polyorganosiloxane base material.

25. The cured viscoelastic silicone rubber composition of claim 24, wherein the at least one permanent crosslinkable group is at least one ethylenically-unsaturated group.

26. The cured viscoelastic silicone rubber composition of claim 1, wherein the permanent crosslinks are formed by a process that creates the permanent crosslinks between the chains of at least one polyorganosiloxane base material.

27. The cured viscoelastic silicone rubber composition of claim 26, wherein the process is electromagnetic radiation.

28. The cured viscoelastic silicone rubber composition of claim 27, wherein the electromagnetic radiation is selected from the group consisting of microwave, near infrared, ultraviolet, x-ray, gamma rays, and high-energy gamma rays.

29. The cured viscoelastic silicone rubber composition of claim 1, wherein the permanent crosslinks are formed by a catalyst.

30. The cured viscoelastic silicone rubber composition of claim 29, wherein the catalyst is platinum.

31. The cured viscoelastic silicone rubber composition of claim 1, wherein the softening agent is selected from the group consisting of water, an alcohol, a polyol, an acid, and a base.

32. The cured viscoelastic silicone rubber composition of claim 1, wherein the softening agent is selected from the group consisting of isostearyl alcohol, isostearic acid, oleic acid, and acetic acid.

* * * * *